(12) United States Patent
Koseki et al.

(10) Patent No.: US 7,358,995 B2
(45) Date of Patent: Apr. 15, 2008

(54) CAPTURED-IMAGE-SIGNAL PROCESSING METHOD AND APPARATUS AND IMAGING APPARATUS

(75) Inventors: Ken Koseki, Kanagawa (JP); Tsutomu Haruta, Kanagawa (JP); Yasuaki Hisamatsu, Kanagawa (JP); Yukihiro Yasui, Kanagawa (JP)

(73) Assignee: Sony Corporation (JP)

( * ) Notice: Subject to any disclaimer, the term of this patent is extended or adjusted under 35 U.S.C. 154(b) by 764 days.

(21) Appl. No.: 10/446,658

(22) Filed: May 29, 2003

(65) Prior Publication Data

US 2004/0027471 A1 Feb. 12, 2004

(30) Foreign Application Priority Data

May 30, 2002 (JP) ............................. P2002-157055

(51) Int. Cl.
*H04N 5/16* (2006.01)
(52) U.S. Cl. ..................... 348/257; 348/691; 348/693; 348/696; 348/697
(58) Field of Classification Search .............. 348/257, 348/695, 697
See application file for complete search history.

(56) References Cited

U.S. PATENT DOCUMENTS

| | | | | |
|---|---|---|---|---|
| 4,293,874 A * | 10/1981 | Reneau | .......... | 348/697 |
| 5,465,067 A * | 11/1995 | Anderson | .......... | 327/322 |
| 6,191,816 B1 * | 2/2001 | Darthenay et al. | .......... | 348/241 |
| 6,580,465 B1 * | 6/2003 | Sato | .......... | 348/689 |
| 6,587,144 B1 * | 7/2003 | Kim | .......... | 348/241 |
| 6,791,607 B1 * | 9/2004 | Bilhan et al. | .......... | 348/243 |
| 2001/0025969 A1 * | 10/2001 | Inui | .......... | 257/225 |

FOREIGN PATENT DOCUMENTS

| EP | 0 654 945 A1 | 11/1994 |
|---|---|---|
| JP | 62-292081 | 12/1987 |

(Continued)

OTHER PUBLICATIONS

Nakamura et al., "On-Focal-Plane Signal Processing for Current-Mode Active Pixel Sensors", IEEE Transactions on Electron Devices, vol. 44, No. 10, Oct. 1997, p. 1747-1758.*

(Continued)

*Primary Examiner*—David Ometz
*Assistant Examiner*—Wanda M. Negrón
(74) *Attorney, Agent, or Firm*—Rader Fishman & Grauer PLLC; Ronald P. Kananen

(57) ABSTRACT

An imaging apparatus includes a solid-state imaging device that outputs a captured image signal in current mode, which in turn is subjected to CDS processing in current mode by a current signal detector, thus suppressing FPN noise. A captured image signal output by the current signal detector is amplified by a programmable gain amplifier to a certain level, and the amplified signal is converted by a current-to-voltage transducer into a voltage signal. In a clamp circuit including a current-output differential amplifier and a current adder, the differential amplifier compares the voltage signal with a reference voltage from a reference voltage source and feeds back a clamp current to the current adder so that the difference between the voltage signal and the reference voltage becomes substantially zero. The current adder is required to simply add a signal current and the clamp current.

12 Claims, 15 Drawing Sheets

FOREIGN PATENT DOCUMENTS

| | | |
|---|---|---|
| JP | 63-26161 | 10/1988 |
| JP | 01-241980 | 9/1989 |
| JP | 04-086167 | 3/1992 |
| JP | 05-219443 | 8/1993 |
| JP | 06-350929 | 12/1994 |
| JP | 07-203319 | 8/1995 |
| JP | 08-251483 | 9/1996 |
| JP | 08-321751 | 12/1996 |
| JP | 10-233965 | 9/1998 |
| JP | 11-122532 | 4/1999 |
| JP | 2001-245220 | 9/2001 |
| WO | WO 00/65824 | 11/2000 |

OTHER PUBLICATIONS

Fossum, Eric R., "Active Pixel Sensors: Are CCD's Dinosaurs?", SPIE—Charge-Coupled Devices and Solid State Optical Sensors, III, vol. 1900, 1993, p. 7.*

IEEE 100: The Authoritative Dictionary of IEEE Standards Terms (2000 7th ed.), p. 171.*

Notification of Reason for Refusal; Patent Application No. 2002-157055; Dated: Jan. 30, 2007.

* cited by examiner

FIG. 3A
FIG. 3B
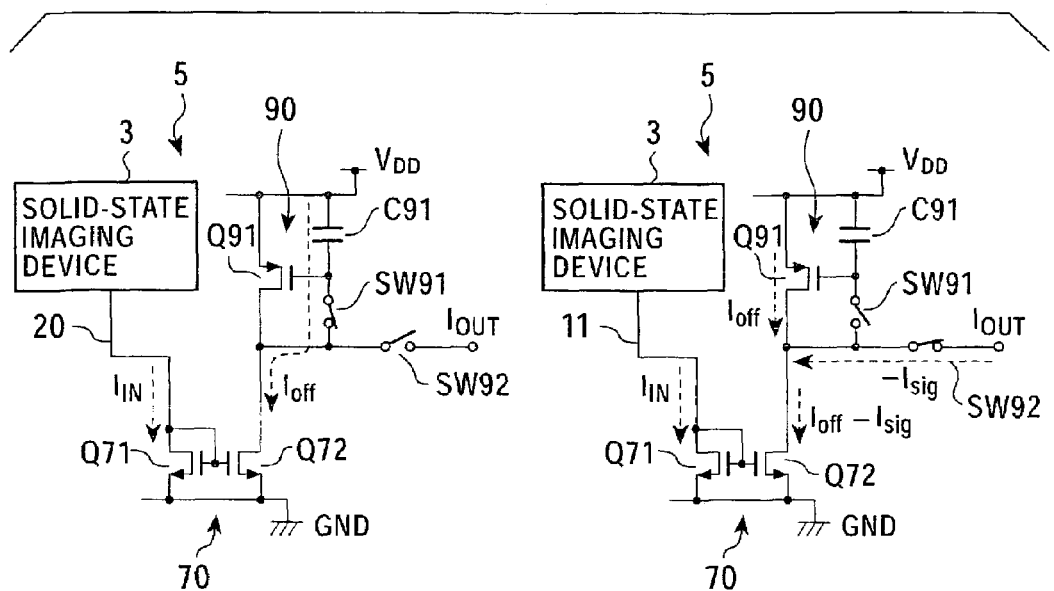
FIG. 3C
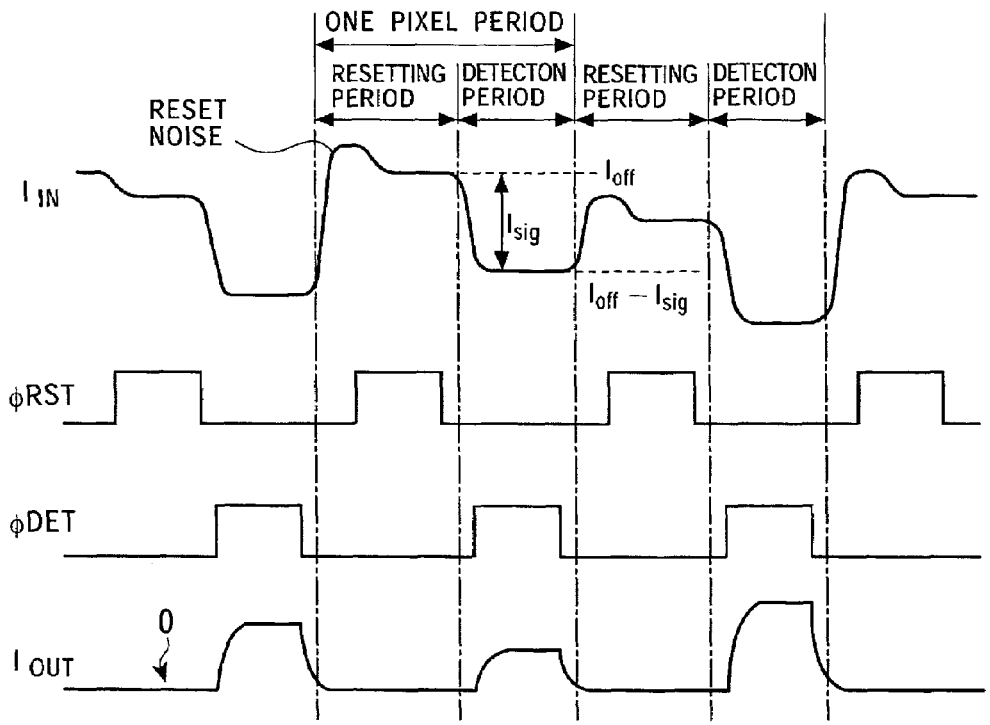

CAPTURED-IMAGE-SIGNAL PROCESSING METHOD AND APPARATUS AND IMAGING APPARATUS

BACKGROUND OF THE INVENTION

1. Field of the Invention

The present invention relates to a method and apparatus for processing an image signal captured by a solid-state imaging device and to an imaging apparatus, which may correspond to an imaging electric equipment module included in a cellular phone, a personal computer, or the like. The electric equipment module may include the solid-state imaging device, a signal processing circuit, a converging lens, and the like.

More particularly, the present invention relates to clamping technology for bringing the direct current (DC) level of a captured image signal closer to a predetermined value, the captured image signal being output from a current-output solid-state imaging device, such as a complementary metal-oxide semiconductor (CMOS) imaging sensor or an amplifier imaging device, for outputting an image signal obtained at each pixel as a current signal.

2. Description of the Related Art

In general, a typical solid-state imaging apparatus performs photo-electric conversion by photo-sensors including photodiodes, detects generated charge by a detection circuit, amplifies the detected charge, and sequentially outputs the amplified charge. In most cases, the detection circuit alternately performs detection and resetting. The detection circuit generates a noise signal referred to as reset noise. As a result, an offset component is generated at each pixel. In the case of a so-called amplifier solid-state imaging device in which each photo-sensor has a detection circuit, variations among detection circuits may cause a noise signal referred to as fixed pattern noise (FPN). The FPN signal is removed by known signal processing referred to as correlated double sampling (CDS).

A noise-removed signal from which noise is removed by a CDS circuit is subjected to signal processing by a programmable gain amplifier (PGA) and converted into a digital signal by an analog-to-digital (A/D) converter, and a digital signal is generated by digital signal processing.

In general, the DC level of a signal output from a solid-state imaging apparatus fluctuates due to various factors, such as a power supply voltage, temperature, or variation in semiconductor device manufacturing processes. As a pixel signal passes through the CDS circuit, the PGA, and the A/D converter, the signal is clamped to an arbitrary DC level using a clamp circuit within an arbitrary period of time. For example, in the case of a solid-state imaging apparatus, the DC level is clamped by adjusting an optical black (OPB) level of an imaging device to a reference level. Various configurations have been proposed to realize the clamp circuit.

FIGS. 12A to 12D are block diagrams schematically showing examples of the configuration of known solid-state imaging apparatuses. FIGS. 12A to 12D show examples of using a current-output solid-state imaging device. A current-mode captured image signal output from a solid-state imaging device 3 is converted into a voltage signal by a current-to-voltage (current/voltage or I/V) transducer circuit 902. The voltage signal passes through a CDS circuit 903, a PGA 904, a DC shifting circuit 905, and an A/D converter 906, and finally sent to a digital signal processing circuit.

A clamp circuit 900 clamps the DC level by comparing, by a differential amplifier 907 provided prior to the A/D converter 906, the output signal level with a reference voltage of a reference voltage source 908 and sending feedback to the DC shifting circuit 905 so that the difference between the output signal level and the reference voltage becomes substantially zero.

With this arrangement, a feedback signal for clamping the DC level is fed back to a stage subsequent to the PGA 904. Alternatively, an additional feedback signal may be sent to a stage prior to the PGA 904. In this case, the input signal level of the PGA 904 is controlled. Thus, a dynamic range of the PGA 904 is prevented from being reduced due to a variation in the DC level. On the other hand, sending the feedback to a stage prior to the CDS circuit 903 is not practical since a DC component is removed by subtraction by the CDS circuit 903. Although sending the feedback to the stage prior to the CDS circuit 903 is not impossible, due to the above circumstances, DC level adjustment is necessary subsequent to CDS processing. In effect, the clamp circuit portion for sending the feedback to the stage prior to the CDS circuit 903 is useless.

In contrast, FIG. 12B shows a case characterized in that an additional independent clamp circuit 901 for ensuring the dynamic range of the CDS circuit 903 is provided. Referring to FIG. 12B, a DC shifting circuit 909 is provided prior to the CDS circuit 903. A differential amplifier 910 monitors the input level of the CDS circuit 903 and sends feedback so that the input level becomes equivalent to a DC voltage of a reference voltage source 922.

The known clamp circuits shown in FIGS. 12A and 12B absorb changes in the DC level of signals to prevent a problem such as the rising black level or the falling black level of the video signal. Such clamp circuits are required to ensure the dynamic range of an analog circuit, such as the CDS circuit 903 or the PGA 904.

In the known solid-state imaging apparatuses illustrated in FIGS. 12A and 12B, a DC shifting circuit(s) is necessary to clamp the DC level. As a result, the system becomes more complicated. In general, a signal processing circuit such as a CDS circuit or PGA processes a signal in the form of voltage. In this case, the clamp circuit is realized by sending feedback to a voltage signal. The DC shifting circuits 905 and 909 are implemented using voltage adders or the like. In some cases, a large capacitive element is used to cut a DC component of the signal.

FIG. 12C shows a case in which the DC shifting circuit 905 shown in FIG. 12A is implemented using a voltage adder. The voltage adder includes resistive elements 911, 912, and 913, a differential amplifier 914, and a reference voltage source 915. The voltage adder adds the output voltage of the PGA 904 and the output voltage of the differential amplifier 907 and outputs the sum to the A/D converter 904. The input voltage of the A/D converter 906 is transferred to an input end of a switching element 917 via a buffer 916, and the switching element 917 is controlled by a clamping pulse, thus maintaining a clamp potential in a holding capacitor 918. The differential amplifier 907 monitors the input voltage of the A/D converter 906 for an arbitrary period of time controlled by the switching element 917 and feeds back an appropriate voltage to the resistive element 912, that is, the input of the voltage adder, so that the input voltage of the A/D converter 906 becomes the same voltage as the voltage of the reference voltage source 908.

FIG. 12D shows a case in which the DC shifting circuit 905 shown in FIG. 12A is implemented using a capacitive element. A capacitive element 919 receives a output signal of the PGA 904, cuts a DC component of the signal, and outputs the DC-component-removed signal via a buffer 920 to the A/D converter 906. The removed DC component is supplied by the differential amplifier 907 for an arbitrary period of time controlled by the switching element 917 and maintained by the capacitive element 919. The differential amplifier 907 monitors the input signal voltage of the A/D converter 906 and sends feedback to the capacitive element 917 so that the input signal voltage becomes the same voltage as the voltage of the reference voltage source 908.

Accordingly, the DC shift circuit for clamping a voltage signal must include a voltage adder, as shown in FIG. 12C, or a capacitive element, as shown in FIG. 12D. This may cause an increase in the circuit size and/or an increase in the layout area. In particular, a large capacitive element is difficult to provide on a semiconductor substrate because of the limited layout area. When such a large capacitive element is provided outside the semiconductor, another problem, such as an increase in the number of PAD (terminals), is caused.

As described above, a known solid-state imaging apparatus must include complicated analog signal processing circuits including a current/voltage transducer circuit, a CDS circuit, a PGA, and an A/D converter. The system requires a clamp circuit for stabilizing the DC level of a captured image signal. As shown in FIGS. 12C and 12D, additional DC shifting circuits are necessary. This may further cause complication in the system.

SUMMARY OF THE INVENTION

In view of the foregoing circumstances, it is an object of the present invention to provide a clamp circuit having a more simplified circuit configuration than a known clamp circuit.

According to an aspect of the present invention, a captured-image-signal processing method for bringing the DC level of a captured image signal output as a current signal from a solid-state imaging device closer to a reference value is provided. The captured-image-signal processing method includes detecting the DC level of the captured image signal for a predetermined period of time and feeding back a clamp current to the captured image signal so that the difference between the detected DC level and a predetermined reference value becomes substantially zero.

According to another aspect of the present invention, a captured-image-signal processing apparatus is provided including a current feedback unit that feeds back a clamp current to a captured image signal output as a current signal from a solid-state imaging device in order to bring the DC level of the captured image signal closer to a reference value.

According to another aspect of the present invention, an imaging apparatus is provided including a solid-state imaging device that outputs a current signal from each pixel via a pixel signal line; and a current feedback unit that feeds back a clamp current to a captured image signal output as a current signal from the solid-state imaging device in order to bring the DC level of the captured image signal closer to a reference value.

In the above-described arrangement, unlike a known clamp circuit for feeding back a voltage signal, the DC level of a captured image signal is controlled by directly adding a clamp current to a signal current using a current-feedback clamp circuit.

BRIEF DESCRIPTION OF THE DRAWINGS

FIGS. 3A to 3C are diagrams and a chart illustrating an example of the configuration of a current signal detector;

DESCRIPTION OF THE PREFERRED EMBODIMENTS

With reference to the accompanying drawings, embodiments of the present invention will be described in detail.

Figure 1A:
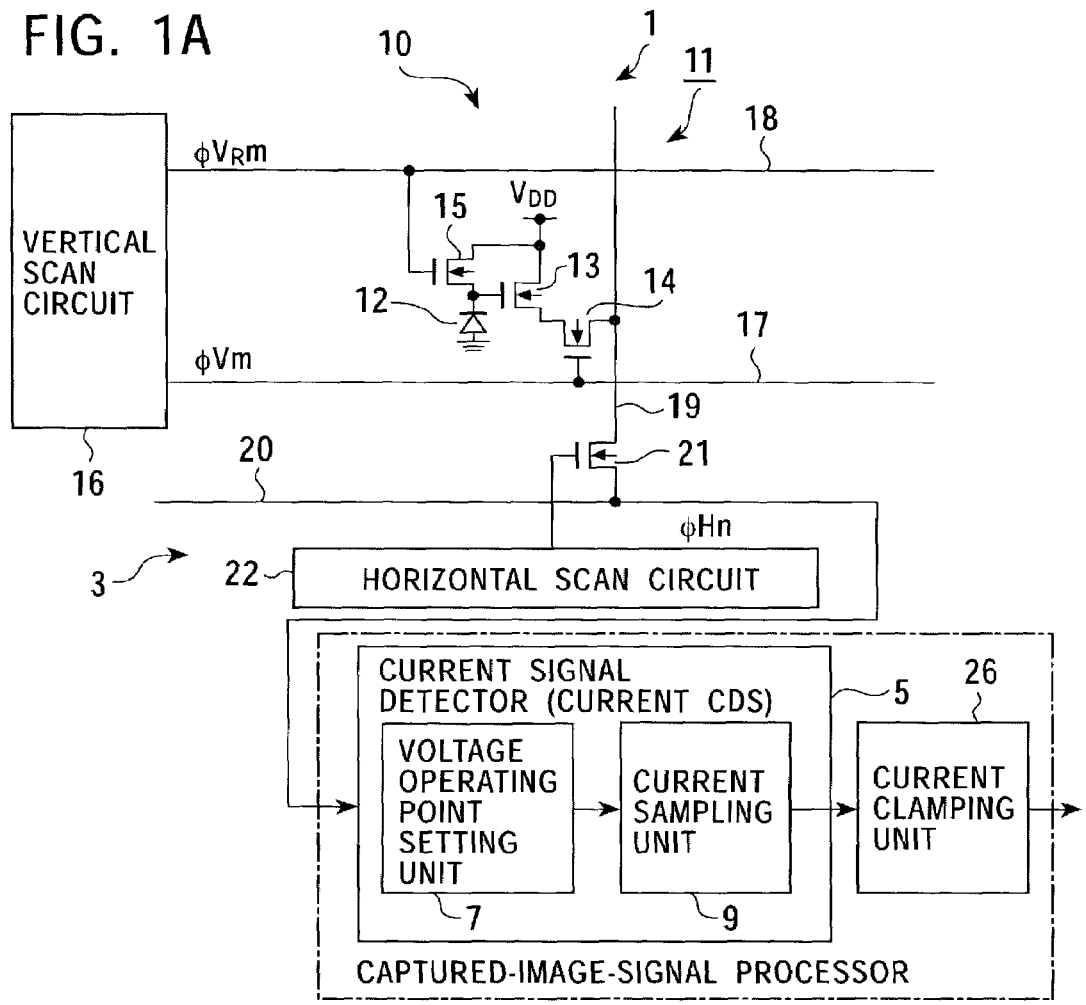
FIGS. 1A and 1B are diagrams of examples of the configuration of an embodiment of an imaging apparatus including a current-output solid-state imaging device and a captured-image-signal processor according to the present invention.
Figure 1B:
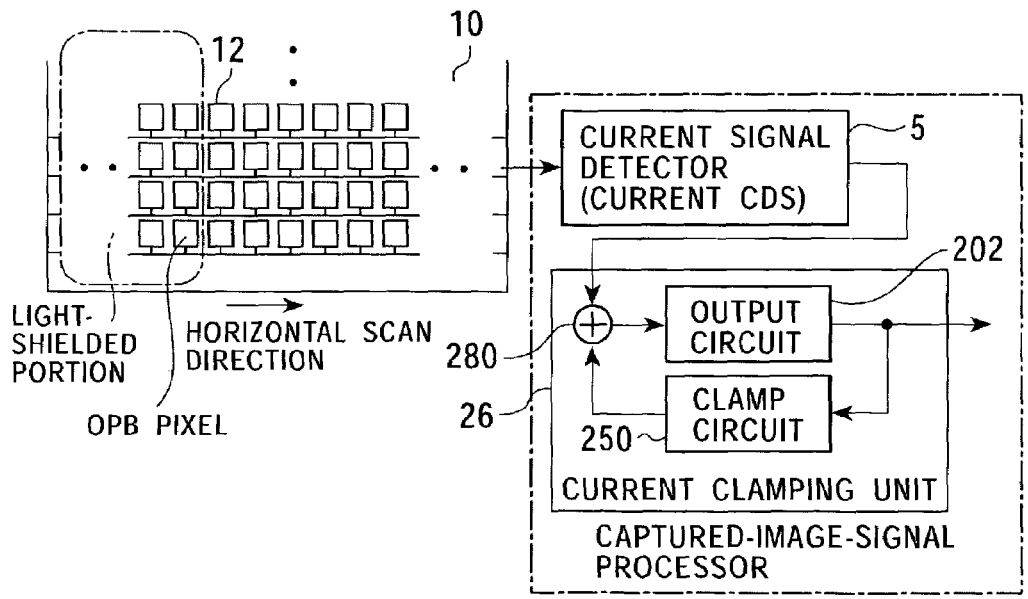

FIGS. 1A and 1B show an example of the configuration of an embodiment of an imaging apparatus including a current-output solid-state imaging device and a captured-image-signal processor according to the present invention. An imaging apparatus 1 includes, for example, a CMOS imaging sensor serving as an solid-state imaging device 3. The imaging apparatus 1 includes, at a stage subsequent to the solid-state imaging device 3, a current signal detector 5 including a voltage operating point setting unit 7 and a current sampling unit 9 and a current clamping unit 26. The solid-state imaging device 3, the current signal detector 5, and the current clamping unit 26 may be arranged on a single semiconductor substrate.

Referring to FIG. 1A, a unit pixel 11 of a photo sensor (sensor array) 10 included in the solid-state imaging device 3 includes a photodiode 12, an amplifier transistor 13, a vertical selection transistor 14, and a resetting transistor 15. In this example, Nch MOS transistors are used to serve as the transistors 13 to 15. A pixel section includes unit pixels 11 arranged in a matrix in the X direction (column direction) and the Y direction (row direction). In order to simplify the diagram, only m-by-n pixels are shown.

In each unit pixel 11, a vertical scan pulse φVm is supplied from a vertical scan circuit 16 via a vertical selection line 17 to the gate electrode of the vertical selection transistor 14. A vertical resetting pulse φV$_R$m is supplied from the vertical scan circuit 16 via a vertical resetting line 18 to the gate electrode of the resetting transistor 15. Signal charge generated by photo-electric conversion by the photodiode 12 is converted by the amplifier transistor 13 into a signal current, and the signal current is output via the vertical selection transistor 14 to a vertical signal line 19.

A horizontal selection transistor 21 is connected between the vertical signal line 19 and a horizontal signal line 20. A horizontal scan pulse φHn is supplied from a horizontal scan circuit 22 to the gate electrode of the horizontal selection transistor 21. This causes the signal current output from the unit pixel 11 to the vertical signal line 19 to flow through the horizontal selection transistor 21 to the horizontal signal line 20.

The current signal detector 5 is connected to a first end of the horizontal signal line 20, and the current clamping unit 26 is connected to the first end of the horizontal signal line 20 via the voltage operating point setting unit 7 and the current sampling unit 9 in the current signal detector 5. Preferably, a current signal detector with a current-mode CDS processing function, such as that described in Japanese Patent Application No. 2002-102108 submitted by the assignee of the present invention, is used to serve as the current signal detector 5.

The voltage operating point setting unit 7 maintains the voltage of the horizontal signal line 20 at a substantially constant level (e.g., in the vicinity of GND level) at all times. The current sampling unit 9 receives a pixel signal through the horizontal signal line 20, which is an example of a pixel signal line, in the form of a current and samples the current to remove an offset current included in the current signal and extracts only a pure signal. Accordingly, FPN included in the pixel signal is suppressed.

The current clamping unit 26 clamps a predetermined position (specifically, OPB) of the signal current, which is input from the horizontal signal line 20 via the current signal detector 5, to maintain the OPB level, which is the reference level of the current signal, at a constant. At a stage subsequent to the current clamping unit 26, if necessary, a current-to-voltage (current/voltage or I/V) transducer circuit that converts a signal current input from the current clamping unit 26 into a signal voltage and outputs the signal voltage is provided.

The solid-state imaging device 3 includes the photo sensor (sensor array) 10 having the photodiodes 12 arranged in a matrix (see FIG. 1B) and output control circuits and output circuits, such as vertical and horizontal scan circuits (not shown). If necessary, a micro lens may be arranged on each of the photodiodes 12 to converge rays of light reflected from an object to be imaged.

Referring to FIG. 1B, a sensor column (light-shielded portion) including light-shielded photodiodes 12 is arranged at one end of the photo sensor 10. The output of the sensor column is always at a black level (OPB level) in which there is no light. Pixels in this light-shielded portion are referred to as OPB pixels. Generally the OPB pixels are arranged in a matrix of a few lines (one line corresponds to a horizontal scan period) adjacent to the start of vertical scan by a few pixels adjacent to the start of horizontal scan.

The current clamping unit 26 detects the DC level of a captured image signal output by the current signal detector 5 in a current mode for a predetermined period and feeds back a clamp current to the captured image signal so that the difference between the detected DC level and a predetermined reference value becomes substantially zero. Specifically, the current clamping unit 26 includes an output circuit 202, a clamp circuit 250, and an adder 280. The current clamping unit 26 detects an output signal of each OPB pixel and compares the level of the output signal with the predetermined reference value. In this embodiment, the output circuit 202 converts a current signal output from the current signal detector 5 into a voltage signal, and the clamp circuit 250 compares the OPB level of the voltage signal with a voltage reference value.

When the output of the OPB pixel is greater than the voltage reference value, the clamp circuit 250 performs negative feedback control in order to reduce the output of the OPB pixel, whereby the clamp level (i.e., OPB level) is changed in accordance with the comparison result and the output level of the OPB pixel is converged to the reference value. In this example of the configuration, subsequent to the CDS processing by the current signal detector 5, a feedback signal in the form of a current (clamp current) from the current clamping unit 26 is added to change the DC level of the signal to a desired value (preset reference value).

Figure 2:
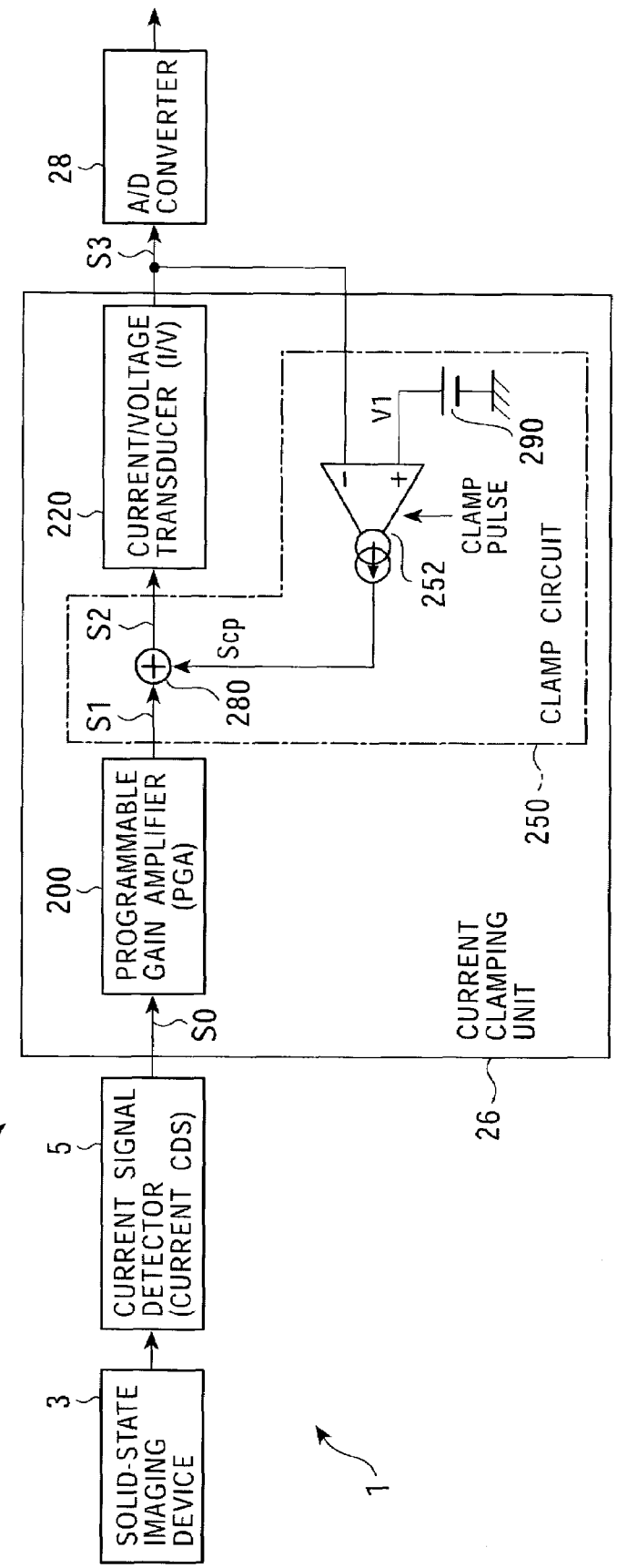
FIG. 2 is a block diagram of the overall imaging apparatus including a current clamping unit.

FIG. 2 is a block diagram of the overall imaging apparatus 1 arranged as described above, which includes the current clamping unit 26. Referring to FIG. 2, the functional configuration of the current clamping unit 26 is illustrated. The current clamping unit 26 includes a PGA 200 for controlling current gain, a current-to-voltage transducer (hereinafter referred to as a current/voltage transducer) 220, which is an example of the output circuit 202 for converting a current signal into a voltage signal, and the clamp circuit 250.

The clamp circuit 250 includes a current-output differential amplifier 252 that monitors a voltage signal S3 output from the current/voltage transducer 220 and outputs the monitoring result in the form of a clamp current Scp. In other words, the current-output differential amplifier 252 has two functions, namely, a function of a DC-level comparator that detects the DC level of a captured image signal for a predetermined period and that computes the difference between the detected DC level and a predetermined reference value by comparing the detected DC level with the reference value and a function of a current feedback unit that feeds back a clamp current to the captured image signal so that the difference between the DC level and the reference value becomes substantially zero.

For example, a clamp pulse for defining the clamp timing is input to a predetermined position (depending on the circuit configuration) of the current-output differential amplifier 252. Specifically, OPB clamping is realized by inputting a pulse in accordance with the position of the OPB pixel of the solid-state imaging device 3.

The current clamping unit 26 includes a current adder 280 that adds a current signal S1 amplified by the PGA 200 to a predetermined level and the clamp current Scp from the current-output differential amplifier 252 and that outputs a combined current S2 and a reference voltage source 290, which is an example of an operation reference point setting unit that sets an operation reference point of the differential amplifier 252. A signal-processing-system A/D converter 28 that converts an analog signal into a digital signal is connected to a stage subsequent to the current clamping unit 26.

In this arrangement, the current signal detector 5 performs CDS subtraction of a captured image signal (in the form of a current signal) output from the current-output solid-state imaging device 3 to detect a current signal S0 and supplies the current signal S0 to the PGA 200. The PGA 200 amplifiers the current signal S0, which has been subjected to the CDS processing by the current signal detector 5, to a predetermined level and supplies the amplified current signal S1 to one terminal of the current adder 280. The current/voltage transducer 220 converts a current signal S2 supplied from the current adder 280 into a voltage signal S3. The voltage signal S3 is converted by the signal-processing-system multi-bit (e.g., 8 to 10 bits) A/D converter 28 into a digital signal.

The differential amplifier 252 included in the clamp circuit 250 monitors the OPB-level voltage value of the voltage signal S3 output from the current/voltage transducer 220 and supplies the monitoring result as the clamp current Scp to the current adder 280, thus supplying current-mode feedback to the input of the current/voltage transducer 220. In other words, the solid-state imaging device 3, the current signal detector 5, the PGA 200, and the current/voltage transducer 220 each output an offset component other than a pure signal component. As a result, the DC level of the output signal changes. The clamp circuit 250 is provided to absorb the change in the DC level using the clamp current Scp.

The clamp function in this example of the configuration is realized by comparing, by the differential amplifier 252, the OPB-pixel output level of the voltage signal S3 output from the current/voltage transducer 220 with a reference voltage V1 of the arbitrary reference voltage source 290 and supplying feedback in the form of a current to a stage subsequent to the PGA 200 so that the difference between the output level and the reference voltage V1 becomes substantially zero. Since the CDS subtraction has been completed by the current signal detector 5, clamping is done at this stage.

Since feedback in the form of a current is supplied, a special circuit such as a voltage adder using a resistor or the like is unnecessary. By simply adding the clamp current Scp to the signal current S1 from the PGA 200, the DC level of the signal component of the OPB pixel is controlled. Therefore, the system is simplified, and the number of components is reduced.

Figure 12A:
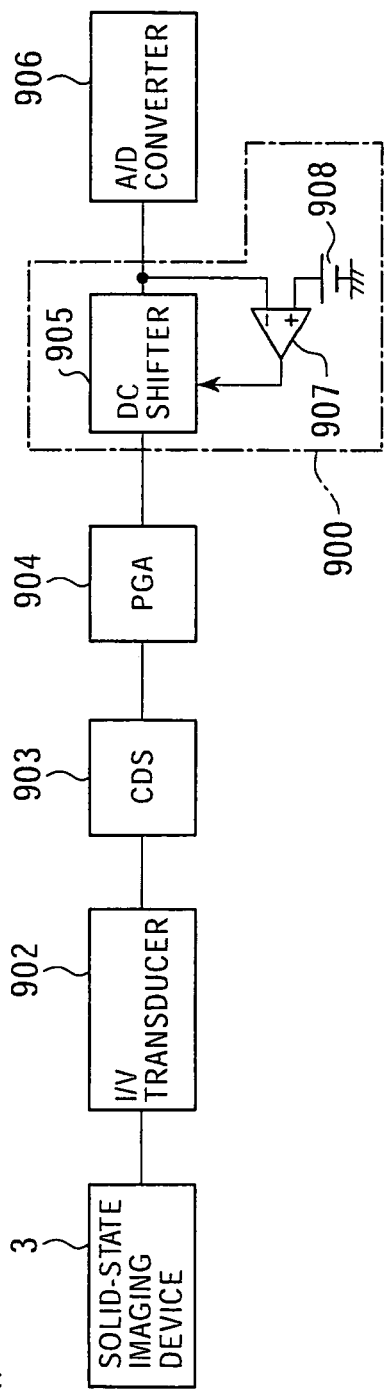
FIGS. 12A to 12D are block diagrams schematically showing examples of the configuration of known solid-state imaging apparatuses.
Figure 12B:
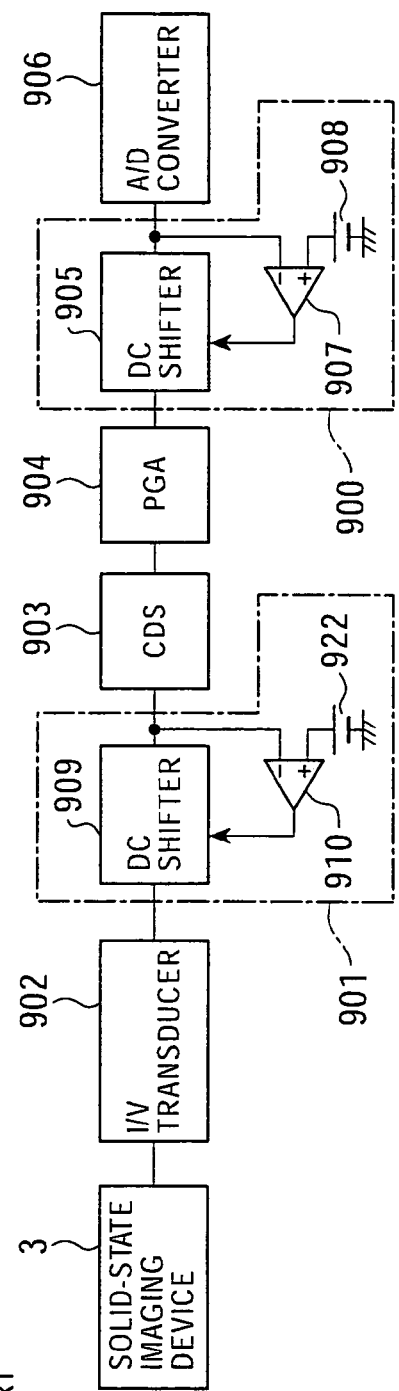
Figure 12C:
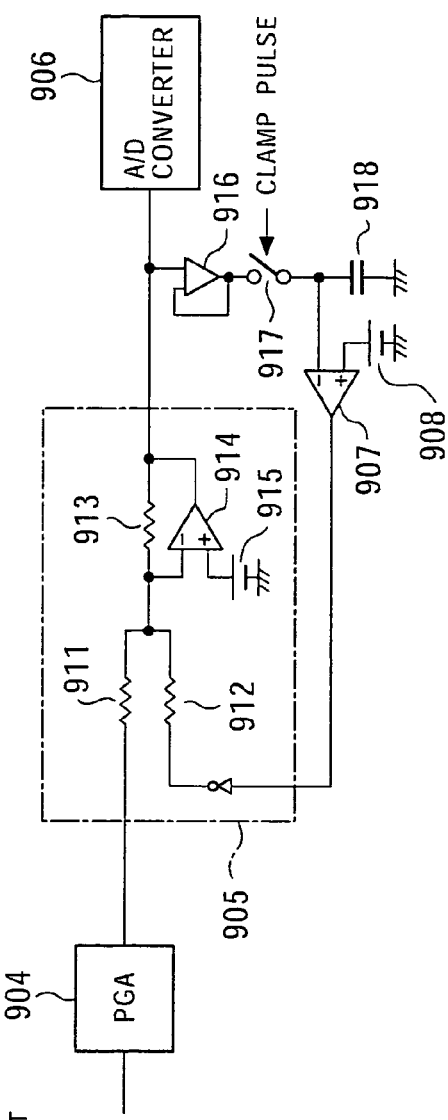
Figure 12D:
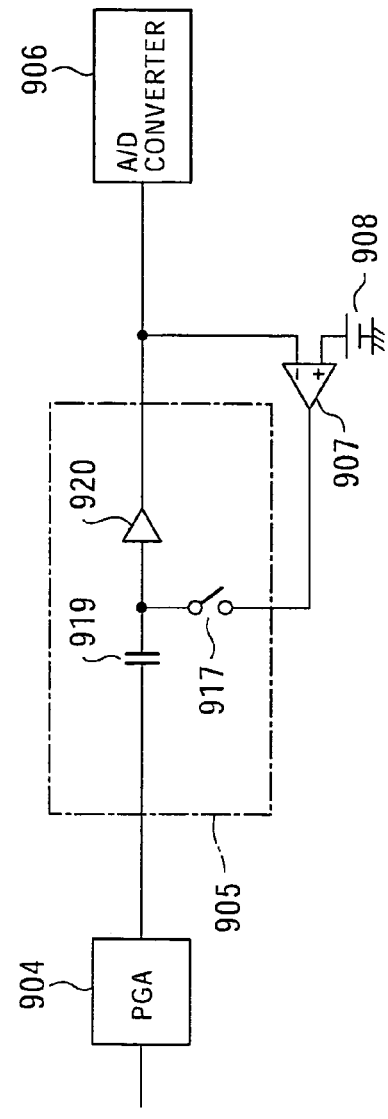

Since the current signal detector 5 with the CDS function and the PGA 200 perform current signal processing, when such signals are processed at a limited power supply voltage, a circuit's dynamic range is ensured more easily than in the case of processing voltage signals. As shown in FIGS. 12A and 12B showing known solid-state imaging apparatuses, a circuit such as the independent DC shifting circuit 909 for ensuring the dynamic range of the CDS circuit 903 is unnecessary. The dynamic range of such an analog circuit is ensured by supplying feedback by the current clamping unit 26 prior to conversion of a current signal into a voltage signal by the current/voltage transducer 220.

In this example, the PGA 200 is arranged subsequent to the current signal detector 5. Alternatively, the PGA 200 may be provided prior to the current signal detector 5 with the CDS function. The PGA 200 may be omitted unless necessary. Alternatively, instead of the PGA 200, another circuit block such as a current sample/hold circuit may be provided.

In this example, the clamp current is fed back to a stage subsequent to the PGA 200. Alternatively, the clamp current may be fed back to a stage immediately after the current signal detector 5. In this case, even when the gain of the PGA 200 is changed, the clamp is difficult to release since both offset components output by the solid-state imaging device 3 and the current signal detector 5 and the clamp current for removing the offset currents are multiplied by the gain. On the other hand, a noise component of the clamp current is also controlled by gain. When the gain is increased, the signal-to-noise ratio may be degraded.

FIGS. 3A to 3C illustrate examples of the configuration of the current signal detector 5 of this embodiment. FIGS. 3A and 3B are circuit diagrams of the current signal detector 5, and FIG. 3C is a timing chart for describing the operation of the current signal detector 5. The configuration shown in FIGS. 3A and 3B is characterized by including a current mirror 70 serving as the voltage operating point setting unit 7 and a current copier (current storage cell) 90 serving as the current sampling unit 9. The configuration is the same as that of an embodiment of a current signal detector described in Japanese Patent Application No. 2002-102108 submitted by the assignee of the present invention.

The current mirror 70 is an example of a current-to-current transducer that receives a current signal output via the horizontal signal line 20, which is an example of the pixel signal line of the solid-state imaging device 3, and that outputs a current signal at a level corresponding to the level of the received current signal.

Referring to FIGS. 3A and 3B, the current mirror 70 includes an Nch MOS transistor Q71 serving as an input element and an Nch MOS transistor Q72 serving as an output element. The drain and gate of the Nch MOS transistor Q71 are commonly connected to the horizontal signal line 20, and the source of the Nch MOS transistor Q71 is connected to ground (GND) serving as a reference potential. The gate of the Nch MOS transistor Q72 is connected to the gate of the Nch MOS transistor Q71, and the source of the Nch MOS transistor Q72 is connected to ground (GND). In other words, the horizontal signal line 20 carrying a signal from the solid-state imaging device 3 is connected to the current mirror 70 including the Nch MOS transistors Q71 and Q72. The Nch MOS transistors Q71 and Q72 have the same characteristics.

Referring to FIGS. 3A and 3B, the current copier 90 includes a Pch MOS transistor Q91, a sampling capacitive element C91, a switching element SW91, and a switching element SW92. The drain, which serves as an input/output terminal of the current copier 90, of the Pch MOS transistor Q91 is connected to the drain of the Nch MOS transistor Q72, and the source of the Pch MOS transistor Q91 is connected to power line $V_{DD}$. The sampling capacitive element C91 is connected between the gate of the Pch MOS transistor Q91 and the power line $V_{DD}$. The switching element SW91 is connected between the gate and the drain of the Pch MOS transistor Q91. The switching element SW92 is connected between the drain of the Pch MOS transistor Q91 and a current output terminal $I_{OUT}$. More specifically, the output of the current mirror 70, that is, the drain terminal of the Nch MOS transistor Q72, is connected to the drain terminal of the Pch MOS transistor Q91. The sampling capacitive element C91 is connected between the gate of the Pch MOS transistor Q91 and the power supply voltage $V_{DD}$. The switching element SW91 is disposed between the gate and the drain of the Pch MOS transistor Q91. With this arrangement, the current copier 90 is provided.

The switching element SW92 is connected to the tip of the node between the drain of the Nch MOS transistor Q72 and the drain of the Pch MOS transistor Q91 and to the current output terminal $I_{OUT}$.

Referring to FIG. 3A, when the switching element SW91 is turned ON and the switching element SW92 is turned OFF, the current copier 90 enters an input phase. Referring to FIG. 3B, when the switching element SW91 is turned OFF and the switching element SW92 is turned ON, the current copier 90 enters an output phase.

In the example shown in FIGS. 3A and 3B, since the solid-state imaging device 3 includes the Nch MOS transistor serving as the amplifier transistor 13, the current mirror 70 includes the Nch MOS transistors, and the current copier 90 includes the Pch MOS transistor. Alternatively, when the solid-state imaging device 3 includes a Pch MOS transistor serving as the amplifier transistor 13, the current mirror 70 and the current copier 90 include transistors, each having opposite polarity (Nch or Pch) to that of the corresponding transistor shown in FIGS. 3A and 3B.

FIG. 3C shows a control pulse φRST of the switching element SW91, a control pulse φDET of the switching element SW92, and an output signal waveform $I_{OUT}$ appearing at the output terminal $I_{OUT}$, all of which are aligned with an output signal waveform $I_{IN}$ of the solid-state imaging device 3. The control pulses φRST and φDET at high level turn ON the corresponding switching elements, and the control pulses φRST and φDET at low level turn OFF the corresponding switching elements. With this switching control by the control pulses φRST and φDET, the Pch MOS transistor Q91 and the sampling capacitive element C91 operate as the current copier 90.

A signal current $I_{IN}$ having the signal waveform shown in FIG. 3C is supplied from the solid-state imaging device 3 via the horizontal signal line 20 to the Nch MOS transistor Q71 of the current mirror 70. The signal waveform is the same as a general output signal waveform of a current-output solid-state imaging device. For example, one pixel period includes a resetting period and a detection period. In the resetting period, an offset component signal $I_{off}$ is output. In the detection period, a detected current "$I_{off}-I_{sig}$" is output. The difference between the offset component signal and the detected current, that is, $I_{sig}$, is a signal current that is essentially necessary.

The signal current $I_{IN}$ output from the solid-state imaging device 3 is supplied via the horizontal signal line 20 to the current mirror 70 including the Nch MOS transistors Q71 and Q72. Since the current mirror 70 operates to equalize the input and output currents, the signal current input to the Nch MOS transistor Q71 appears unchanged at the drain of the Nch MOS transistor Q72.

When the output signal $I_{IN}$ of the solid-state imaging device 3 is in the resetting period, as shown in FIG. 3A, the control pulse φRST at high level turns ON the switching element SW91, and the control pulse φDET at low level turns OFF the switching element SW92. At this time, the current copier 90 enters the input phase and receives the entire current $I_{off}$ flowing from the solid-state imaging device 3 through the current mirror 70.

A voltage at a level corresponding to the level of the signal current (offset component) $I_{off}$ appears at the gate terminal of the Pch MOS transistor Q91. In the next moment, the switching element SW91 is turned OFF. Accordingly, the gate voltage at that time is stored in the capacitive element C91. The current copier 90 enters the output phase, stores the previously received offset voltage $I_{off}$, and tries to continuously pass the offset voltage $I_{off}$.

In this state, the output signal $I_{IN}$ of the solid-state imaging device 3 enters the detection period, and the signal "$I_{off}-I_{sig}$" flows through the current mirror 70. Since the current copier 90 is in the output phase, the current copier 90 tries to continuously pass the stored current $I_{off}$ which is stored in advance in the capacitive element C91. At this time, turning ON the switching element SW92 enables the difference between the current $I_{off}$ stored by the current copier 90 and the signal current "$I_{off}-I_{sig}$" flowing through the current mirror 70 to appear at the current output terminal $I_{OUT}$. In other words, "$I_{OUT}=I_{off}-(I_{off}-I_{sig})=I_{sig}$", and hence only the pure signal $I_{sig}$ containing no offset component $I_{off}$ appears at the current output terminal $I_{OUT}$.

Using the arrangement shown in FIGS. 3A to 3C, the offset component current $I_{off}$, which may cause FPN, is removed, and only the original signal component $I_{sig}$ is extracted as the current signal $I_{OUT}$ from the output terminal $I_{OUT}$. Accordingly, the current-mode CDS processing function (that is, FPN surprising function) is realized. Although the output current signal is not a continuous wave, the output current signal is converted into a continuous wave by sampling.

The above-described circuit includes the current mirror 70 including the Nch MOS transistors Q71 and Q72 and the current copier 90 including the Pch MOS transistor Q91, the capacitive element C91, and the switching elements SW91 and SW92. The circuit configuration is very simple, and the number of elements is small. The current copier 90 functioning as the current sampling unit 9 only has two control phases, that is, the storage phase during the resetting period and the output phase during the detection period. Accordingly, the current copier 90 is controlled in a very simple manner.

The potential of the pixel signal line 20 is determined at all times by the diode-connected Nch MOS transistor Q71 included in the current mirror 70. In other words, the potential of the pixel signal line 20 is the sum of Vth of the Nch MOS transistor Q71 and a bias that depends on the current value at that time and the transistor size. The potential of the pixel signal line 20 is stabilized in the vicinity of GND by selecting appropriate Vth and size of the transistor. Accordingly, the amplifier transistor 13 in the solid-state imaging device 3 always has a satisfactory gain, and linearity degradation is prevented.

Figure 4:
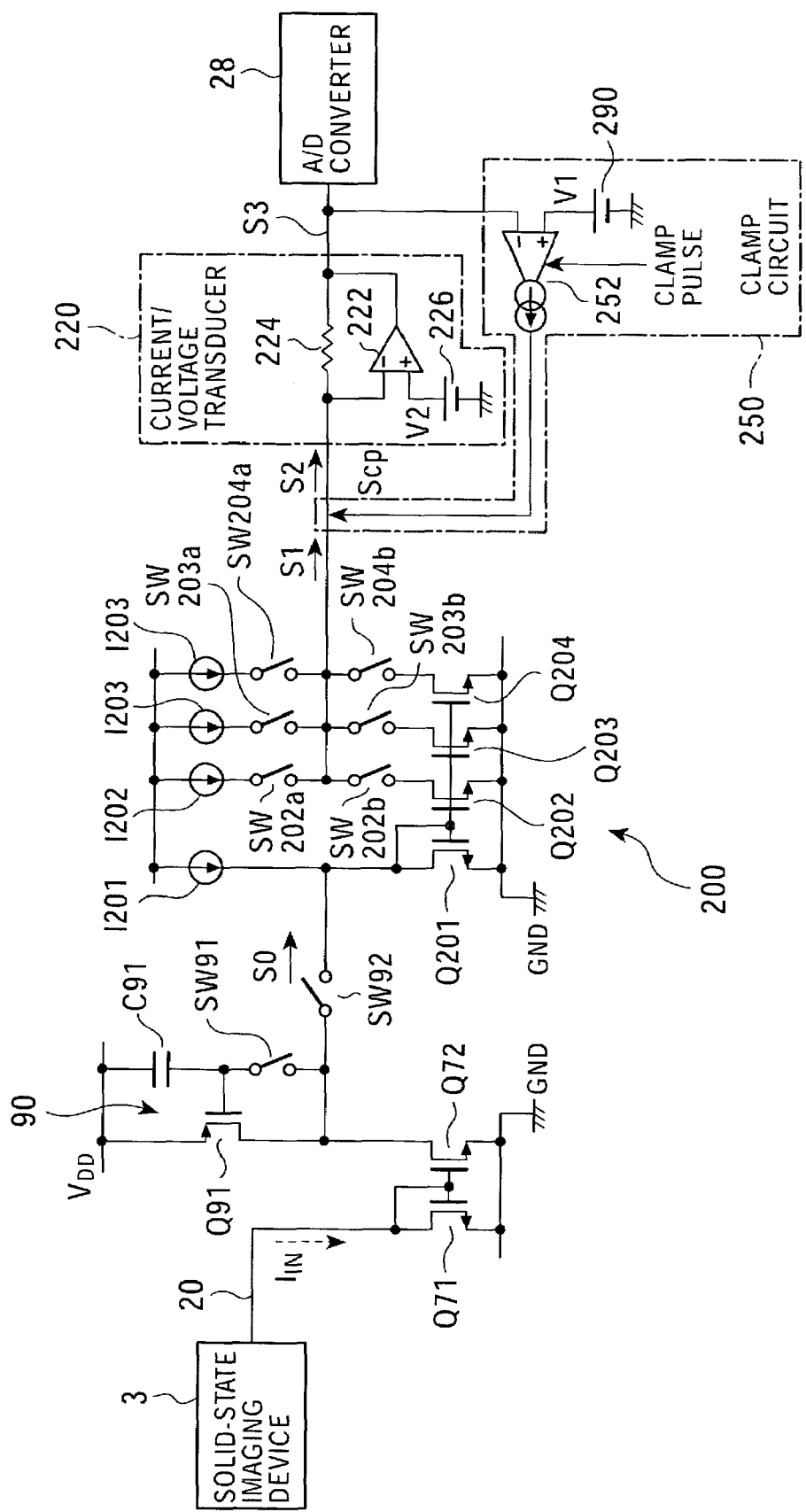
FIG. 4 is a block diagram showing a more specific example of the imaging apparatus.

FIG. 4 is a diagram showing a specific example of the configuration of the imaging apparatus 1. In addition to the current signal detector 5 using the current copier 90 shown in FIGS. 3A and 3B, the imaging apparatus 1 includes the PGA 200 and the current/voltage transducer 220.

The PGA 200 disposed at a stage subsequent to the current signal detector 5 includes a current mirror circuit including Nch MOS transistors Q201, Q202, Q203, and Q204, current sources I201, I202, I203, and I204 associated with the corresponding Nch MOS transistors Q201 to Q204, and switching elements SW202a, SW202b, SW203a, SW203b, SW204a, and SW204b arranged between the corresponding Nch MOS transistors Q202 to Q204 and the current sources I202 to I204.

In the example shown in FIG. 4, the Nch MOS transistor Q201 and the current source I201 are arranged at the current input side, and the Nch MOS transistors Q202 to Q204 and the current sources I202 to I204 are arranged at the current output side in a switchable manner. In other words, three output stages of the current mirror circuit are juxtaposed at the output side. The arrangement of the current mirror circuit depends on the necessary gain. In other words, the arrangement of the current mirror circuit is not limited to three juxtaposed stages. Although the current mirror circuit includes Nch MOS transistors, Pch MOS transistors may be used.

A current signal S0 output from the current signal detector 5 is input to the gate terminal of the Nch MOS transistor Q201 at the input side of the PGA 200 with a current mirror configuration. The current mirror circuit simply outputs an input current in accordance with the mirror ratio. With a variable mirror ratio, the current mirror circuit functions as a PGA. The switching elements SW202a to SW204b are provided to change the mirror ratio. The mirror ratio is determined by turning ON the switching elements SW202a to SW202b in accordance with the necessary gain. The current sources I202 to I204 are arranged to provide a mechanism for passing a bias current that enables the PGA 200 to operate even when the signal current S0 from the current signal detector 5 is zero.

The current/voltage transducer 220 provided at a stage subsequent to the PGA 200 includes a differential amplifier 222, a resistive element 224 arranged between the inverting input terminal (−) and the output terminal of the differential amplifier 222, and a reference voltage source 226 arranged between the non-inverting input terminal (+) of the differential amplifier 222 and a reference voltage (i.e., ground (GND)). The reference voltage source 226 supplies a reference voltage based on which the current-to-voltage conversion is performed by the current/voltage transducer 220.

The PGA 200 outputs a current signal S1 to the inverting input terminal (−) of the differential amplifier 222 included in the current/voltage transducer 220. Also, the differential amplifier 252 with the clamp function in the current mode outputs a clamp current Scp to the inverting input terminal (−) of the differential amplifier 222. The current signal S1 is combined with the clamp current Scp to generate a current signal S2.

With this arrangement, the current signal S1 from the PGA 200 is combined with the clamp current Scp from the differential amplifier 252 to generate the current signal S2 at the inverting input terminal (−) of the differential amplifier 222, and the current signal S2 is immediately converted into a voltage signal S3 by the differential amplifier 222. Since the currents are directly added at the inverting input terminal (−) of the differential amplifier 222, a special circuit such as a voltage adder using a resistor is unnecessary, and the number of components is reduced. Accordingly, the current clapping circuit matched with the current-output solid-state imaging device 3 is realized.

With this arrangement, the differential amplifier 252 monitors the input voltage of the A/D converter 28, that is, the voltage signal S3 output from the current/voltage transducer 220, for an arbitrary period of time (OPB time in the previous example) controlled by a switching element and supplies current-mode feedback to the input of the current/voltage transducer 220 (inverting input terminal (−) of the differential amplifier 222 in this example) so that the difference between the voltage signal S3 and the voltage of the reference voltage source 290 connected to the non-inverting input terminal (+) of the differential amplifier 252 becomes substantially zero. A sample/hold circuit or the like may be provided prior to the differential amplifier 252 in order to maintain the value monitored during the ON period for a period for which the switching element is OFF.

According to the current-feedback current clamping circuit 26 described above, a voltage adder and a capacitive element for cutting a DC component, which are required by a voltage-feedback clamping circuit, become unnecessary. Clamping is done by simply adding the clamp current Scp to the signal current S1. Therefore, the number of components is reduced, and the number of circuits through which a signal passes is reduced. As a result, noise contamination is reduced.

The circuit for supplying a clamp current is easily implemented using, for example, constant current characteristics of MOS transistors. The system is prevented from becoming complicated. Particularly, a current-feedback clamp circuit is implemented with a current CDS circuit, such as the current signal detector 5 illustrated in FIG. 4, contributing to simplification of the system. For example, using CMOS transistors and the like, the solid-state imaging device 3, the current signal detector 5, and the current clamping unit 26 may be integrated and arranged on a semiconductor substrate.

Since the current signal detector 5 with the CDS function and the PGA 200 perform current signal processing, the circuit's dynamic range is ensured in a more reliable manner than in the case of voltage signal processing.

Figure 5A:
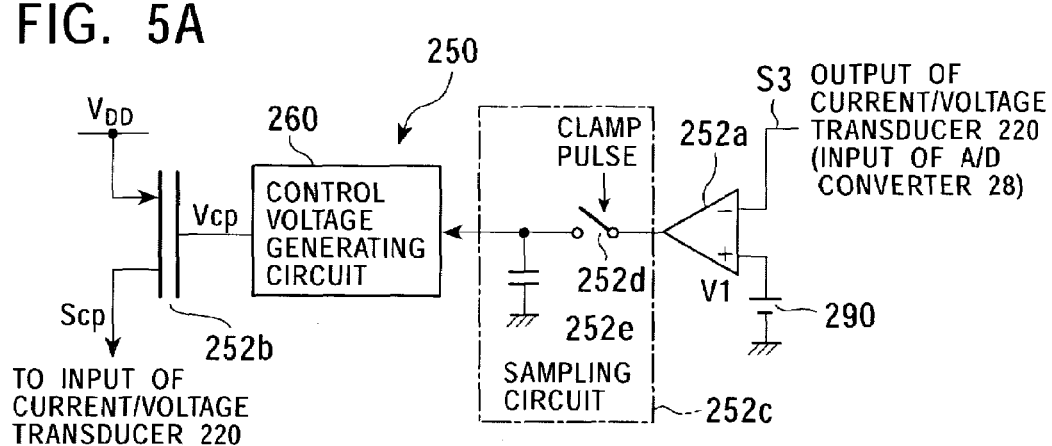
FIGS. 5A to 5C are diagrams showing specific examples of clamp circuits.
Figure 5B:
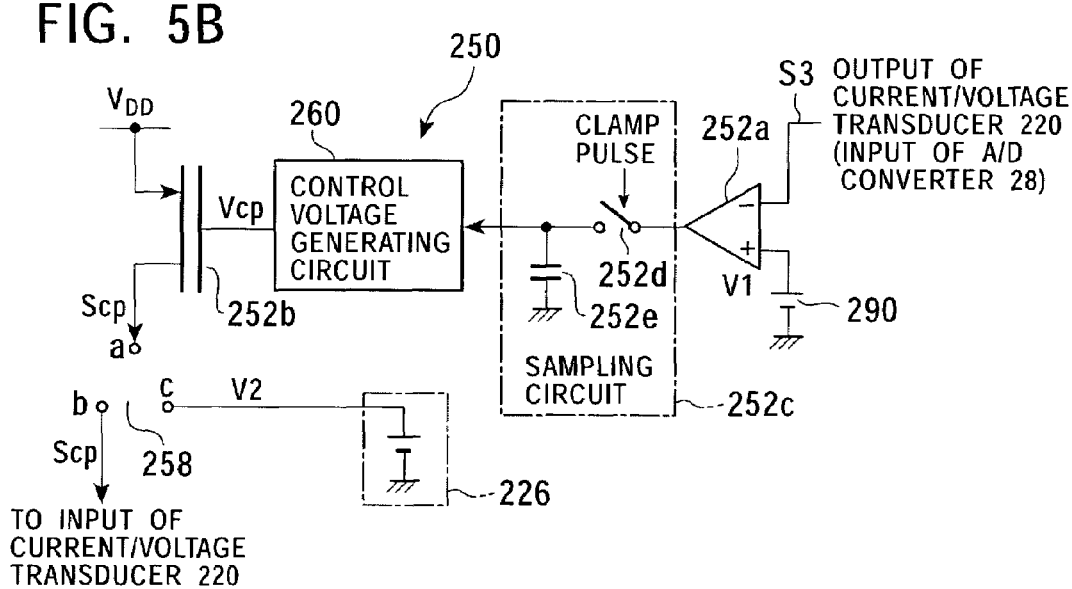
Figure 5C:
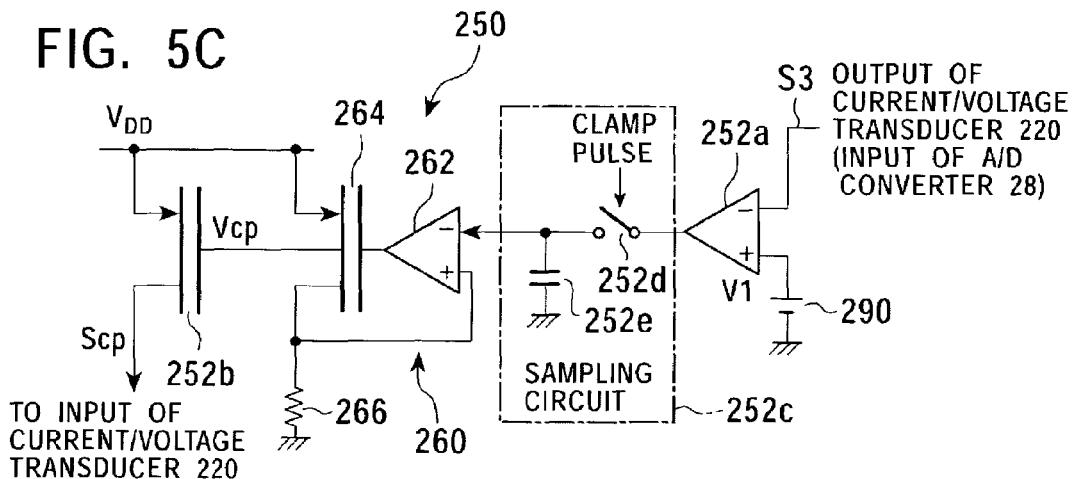

FIGS. 5A to 5C show specific examples of the configuration of the clamp circuit 250. FIG. 5A shows an example in which the current-output differential amplifier 252 is implemented using a CMOS transistor. The current-output differential amplifier 252 includes a differential amplifier 252a, a Pch MOS transistor 252b, and a sampling circuit 252c. The sampling circuit 252c includes a switching element 252d and a holding capacitor 252e. The holding capacitor 252e holds the output voltage of the differential amplifier 252a, which is sampled for a clamp period defined by a clamp pulse.

The clamp circuit 250 includes a control voltage generating circuit 260 arranged between the sampling circuit 252c and the Pch MOS transistor 252b. In response to the sampling voltage held in the holding capacitor 252e, the control voltage generating circuit 260 generates a clamp voltage Vcp for controlling the gate terminal of the Pch MOS transistor 252b.

The source terminal of the Pch MOS transistor 252b is connected to a voltage source ($V_{DD}$ in this example), and the drain terminal of the Pch MOS transistor 252b is connected to the input of the current/voltage transducer 220. With reference to the current/voltage transducer 220 shown in FIG. 4, the drain terminal is connected to the inverting input terminal (−) of the differential amplifier 222, and the clamp current Scp generated by the Pch MOS transistor 252b is input to the inverting input terminal (−) of the differential amplifier 222.

By applying, by the control voltage generating circuit 260, a voltage that enables the Pch MOS transistor 252b to operate in its saturation region, the Pch MOS transistor 252b operates as a current source for producing a current in accordance with the gate-source voltage. In other words, the Pch MOS transistor 252b functions as a voltage/current transducer that converts the clamp voltage Vcp output from the control voltage generating circuit 260 into the clamp current Scp. Accordingly, the clamp circuit 250 realizes the function of the current-output clamp circuit.

Alternatively, instead of using the control voltage generating circuit 260, the sampling voltage held in the holding capacitor 252e may be directly applied to the gate terminal of the Pch MOS transistor 252b. Accordingly, the DC level of the output signal is controlled. In other words, the clamp function is activated.

In the example shown in FIG. 5A, only the Pch MOS transistor 252b is employed to supply the clamp current Scp to the input of the current/voltage transducer 220. Alternatively, an Nch MOS transistor may be used in place of the Pch MOS transistor 252b, thus pulling the clamp current Scp from the input of the current/voltage transducer 220 into the Nch MOS transistor side. Alternatively, both the Pch MOS transistor and the Nch MOS transistor may be used by changing the current flowing direction.

In the example shown in FIG. 5A, the Pch MOS transistor 252b is used to convert the clamp voltage Vcp output from the control voltage generating circuit 260 into the clamp current Scp. Alternatively, the output terminal of the differential amplifier 252a may be a current output terminal. Accordingly, the clamp current Scp is directly generated at the output of the current-output differential amplifier without using the control voltage generating circuit 260 and the voltage-current transducer including the MOS transistor or the like.

FIG. 5B shows a second example in which a three-terminal switching element 258 is arranged adjacent to the drain terminal of the Pch MOS transistor 252b. The three-terminal switching element 258 has an input terminal a connected to the drain terminal of the Pch MOS transistor 252b, a first output terminal b connected to the input terminal of the current/voltage transducer 220, and a second output terminal c connected to the operation reference point of the current/voltage transducer 220.

With reference to the current/voltage transducer 220 shown in FIG. 4, the output terminal b is connected to the inverting input terminal (−) of the differential amplifier 222, and the clamp current Scp generated by the Pch MOS transistor 252b is input to the inverting input terminal (−) of the differential amplifier 222 via the three-terminal switching element 258. The output terminal c is connected to the non-inverting input terminal (+) of the current/voltage transducer 220, and the same reference voltage V2 as that of the reference voltage source 226 connected to the non-inverting input terminal (+) is applied to the output terminal c. The role of the three-terminal switching element 258 will now be described.

As in the specific example of the current signal detector 5 described with reference to FIGS. 3A to 3C, when a current copier cell is used to perform the current-mode CDS processing, the switching element SW92 must be closed to do sampling during the resetting period. At this time, the signal current S1 does not flow through the PGA 200 and the clamp circuit 250. Therefore, only the clamp current Scp flows through the current/voltage transducer 220.

The clamp current Scp flows through the current/voltage transducer 220 so that the dynamic range of the current/voltage transducer 220 is ensured for a period for which the signal current is flowing. When the flow of signal current S1 stops, the current/voltage transducer 220 may temporarily become out of its dynamic range due to the clamp current Scp. In general, when a current/voltage transducer circuit including a differential amplifier becomes out of its dynamic range, the operating speed is significantly reduced. It may take a long time for the current/voltage transducer circuit to return to the normal operation state.

In order to avoid such problems, the switching element 258 is turned ON and OFF with the same timing as the switching element SW92. Specifically, when the switching element SW92 is turned OFF and the flow of signal current S1 to the current/voltage transducer 220 stops, the switching element 258 is disconnected from the output terminal b, and the input of the current/voltage transducer 220 is disconnected from the Pch MOS transistor 252b. This stops feedback of the clamp current Scp to the captured image signal S1, which is input to the current/voltage transducer 220. As a result, the clamp current Scp is prevented from flowing into the current/voltage transducer 220, and the current/voltage transducer 220 does not become out of the dynamic range.

When the switching element 258 is simply disconnected, the flow of clamp current Scp from the Pch MOS transistor 252b loses its destination, and the current value of the clamp current Scp becomes zero. The next time the switching element 258 is connected to the output terminal b and the flow of clamp current Scp restarts, it takes time for the clamp current Scp to settle to a desired current value. As a result, the signal may not be reproduced faithfully within a predetermined period of time.

In order to prevent such problems, instead of simply turning ON and OFF the switching element 258, as shown in FIG. 5B, when turning OFF the switching element SW92, the switching element 258 is disconnected from the output terminal b and is connected to the output terminal c, thereby being connected to the non-inverting input terminal (+) of the current/voltage transducer 220, that is, to the reference voltage source 226 connected to the non-inverting input terminal (+). In other words, the feedback of clamp current Scp to the captured image signal is stopped during the resetting period for which the switching element SW92 is OFF, and the clamp current Scp (feedback thereof has been stopped) is returned to the reference voltage source 226 for setting the operation reference point of the current/voltage transducer 220.

Accordingly, when viewed from the Pch MOS transistor 252b for passing the clamp current Scp, there is no apparent distinction between a case in which the clamp current Scp is introduced into the current/voltage transducer 220 and a case in which the flow of clamp current Scp is stopped. Accordingly, current controlled by the control voltage generating circuit 260 is passed at all times, and the stability of the clamp current Scp is maintained. In other words, the clamp current Scp is stable at all times, and desired current is immediately obtained the next time the clamp current Scp is fed to the captured image signal S1.

FIG. 5C shows a third example of the specific configuration of the control voltage generating circuit 260. The control voltage generating circuit 260 includes a differential amplifier 262, a Pch MOS transistor 264, and a resistive element 266. The Pch MOS transistor 264 has the source terminal connected to a voltage source ($V_{DD}$ in this example), the gate terminal connected to the output terminal of the differential amplifier 262 (commonly with the gate terminal of the Pch MOS transistor 252b), and the drain terminal connected to the non-inverting input terminal (+) of the differential amplifier 262. The output voltage of the differential amplifier 252a is input to the inverting input terminal (−) of the differential amplifier 262.

With this arrangement, the control voltage generating circuit 260 receives the output voltage of the differential amplifier 252a and generates appropriate voltage for driving the Pch MOS transistor 252b. In other words, the differential amplifier 262 controls the gate voltage of the Pch MOS transistor 264 so that the output voltage of the differential amplifier 252a and a voltage applied to the resistive element 266 are the same with each other. Since a current flowing through the Pch MOS transistor 264 is controlled by the resistive element 266 and the voltage applied to the resistive element 266, the gate voltage of the Pch MOS transistor 264, which is necessary to pass that current, is automatically determined.

The Pch MOS transistor 264 and the Pch MOS transistor 252b at a subsequent stage have the same performance and characteristic. The performances of the Pch MOS transistors 264 and 252b and the value of the resistive element 266 are determined to enable the Pch MOS transistors 264 and 252b to operate in their saturation regions. In such a case, currents flowing through the Pch MOS transistors 264 and 252b are made equal by directly supplying the gate voltage of the Pch MOS transistor 264 to the gate terminal of the Pch MOS transistor 252b. In other words, the clamp current Scp supplied by the Pch MOS transistor 252b is controlled by the resistive element 266 and the voltage applied to the resistive element 266.

The configuration of the control voltage generating circuit 260 illustrated in FIG. 5C is only an example, and various other configurations are possible. For example, the differential amplifier 252a may be used as a comparator, and the control voltage generating circuit 260 at a subsequent stage may include a digital circuit to perform various processes. In other words, an arithmetic processor including a digital circuit may be included. In this case, the processing result of the digital circuit (digital value) is converted by a D/A converter into an analog signal (e.g., voltage signal), and the analog signal is supplied as the input voltage to the Pch MOS transistor 252b. The Pch MOS transistor 252b thus generates the clamp current Scp.

As described above, according to the above-described embodiment, the current-feedback clamp circuit is used. Components, such as a voltage adder and a capacitive element for cutting a DC component, which are necessary in the case of a voltage-feedback clamp circuit, become unnecessary. DC clamping is done by simply feeding back the clamp current to the signal current. The number of components is reduced, and the number of circuits through which a signal passes is reduced. As a result, noise contamination is reduced.

As illustrated in the specific examples of the configuration in FIGS. 5A to 5C, the circuit for supplying the clamp current is easily implemented using constant current characteristics of MOS transistors. The system is prevented from becoming complicated. Furthermore, when signals are processed at a limited power supply voltage, a combined use of the CDS circuit and PGA circuit for performing current signal processing ensures the circuit's dynamic range more easily than in the case of processing voltage signals.

Figure 6A:
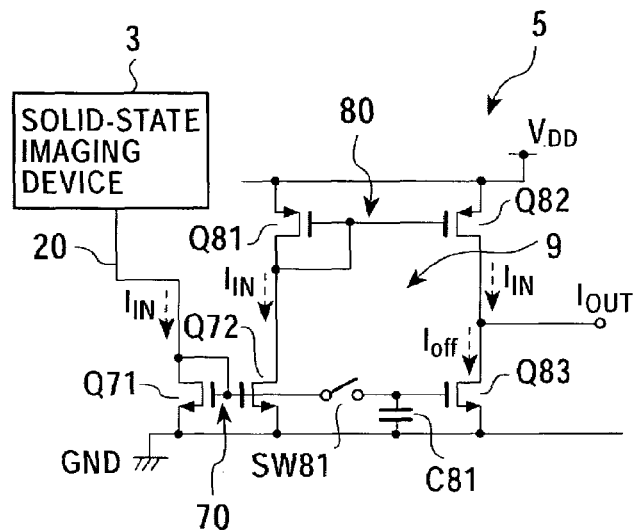
FIGS. 6A and 6B are a diagram and a chart, respectively, showing an example of the configuration of another embodiment of the current signal detector.
Figure 6B:
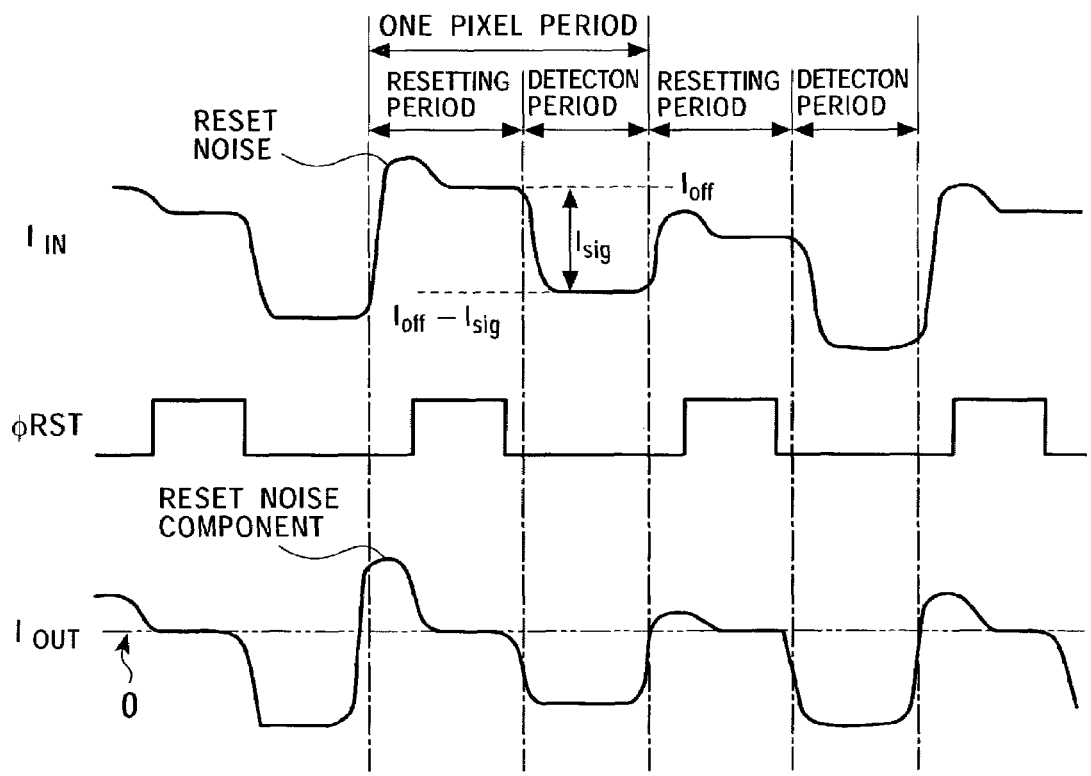

FIGS. 6A and 6B show an example of the configuration of another embodiment of the current signal detector 5. FIG. 6A is a circuit diagram of the current signal detector 5, and FIG. 6B is a timing chart for describing the operation of the current signal detector 5. The configuration is the same as that of a sixth embodiment of a current signal detector described in Japanese Patent Application No. 2002-102108 submitted by the assignee of the present invention.

The current signal detector 5 of this embodiment uses the current mirror 70 as the voltage operating point setting unit 7, as in the embodiment shown in FIGS. 3A and 3B. In contrast, the current signal detector 5 of this embodiment uses, in place of the current copier 90 of the embodiment shown in FIGS. 3A and 3B, a switching element SW81, a capacitive element C81 that receives a current signal when the switching element SW81 is ON and maintains a voltage in accordance with the current signal, a current mirror 80, and an Nch MOS transistor Q83 serving as a current mirror with another transistor when the switching element SW81 is ON. A combination of the sample/hold circuit including the switching element SW81 and the capacitive element C81 and the current mirror achieves the operation similar to that of the current copier 90.

The current mirror 80 includes a Pch MOS transistor Q81 serving as an input element and a Pch MOS transistor Q82 serving as an output element. The drain and gate of the Pch MOS transistor Q81 are commonly connected to the drain of the Nch MOS transistor Q72, which is a component of the current mirror 70 functioning as the voltage operating point setting unit 7. The source of the Pch MOS transistor Q81 is connected to the power supply $V_{DD}$. The gate of the Pch MOS transistor Q82 is connected to the gate of the Pch MOS transistor Q81, and the source of the Pch MOS transistor Q82 is connected to the power supply $V_{DD}$. The Pch MOS transistors Q81 and Q82 have the same characteristics.

The gate of the Nch MOS transistor Q71 is connected to one end of the capacitive element C81 and to the gate of the Nch MOS transistor Q83 via the switching element SW81. The other end of the capacitive element C81 and the source of the Nch MOS transistor Q83 are connected to GND, which serves as a voltage reference.

A control pulse φRST for controlling the switching element SW81 is supplied to the switching element SW81. The control pulse φRST at high level turns ON the switching element SW81. As shown in FIG. 6B, the switching element SW81 is turned ON only when the output current of the solid-state imaging device 3 is in the resetting period. When the switching element SW81 is ON, the Nch MOS transistors Q71 and Q83 operate as a current mirror.

The operation of the current signal detector 5 according to this embodiment will now be described. The Nch MOS transistors Q71 and Q72 operate as the current mirror 70. The Nch MOS transistor Q72 operates so as to pass the signal current $I_{IN}$ received by the Nch MOS transistor Q71 without changing the signal current $I_{IN}$. The output current of the Nch MOS transistor Q72 is input to the current mirror 80 including the Pch MOS transistors Q81 and Q82, and the output current appears unchanged as the output current at the drain of the Pch MOS transistor Q82.

For example, when the output current of the solid-state imaging device 3 is in the resetting period, the current mirror 70 inputs the offset current $I_{off}$ to the current mirror 80 including the Pch MOS transistors Q81 and Q82 without changing the offset current $I_{off}$. The current mirror 80 outputs the offset current $I_{off}$ in the resetting period to the Nch MOS transistor Q83 and the output terminal $I_{out}$ without changing the offset current $I_{off}$.

Since the gates of the Nch MOS transistors Q71 and Q83 are connected via the switching element SW81 to form a current mirror during the resetting period, the offset current $I_{off}$ in the resetting period appears unchanged at the drain of the Nch MOS transistor Q83. At the same time, the gate of the Nch MOS transistor Q71 is connected to the capacitive element C81 via the switching element SW81. Thus, the gate voltage of the Nch MOS transistor Q71 is stored and maintained in the capacitive element C81.

The difference between the currents of the Nch MOS transistor Q83 and the Pch MOS transistor Q82 is output to the output terminal $I_{OUT}$. At this time, as shown in FIG. 6B, the output current $I_{OUT}$ is zero since the Nch MOS transistor Q83 and the Pch MOS transistor Q82 pass offset currents $I_{off}$ at the same level.

When the output current of the solid-state imaging device 3 is in the detection period, the switching element SW81 is OFF. At this time, the gate voltage corresponding to the current flowing through the Nch MOS transistor Q71 is stored and maintained in the capacitive element C81 and supplied to the gate of the Nch MOS transistor Q83. Even when the switching element SW81 is OFF, a current corresponding to the voltage stored in the capacitive element C81 flows through the Nch MOS transistor Q83.

With the Nch MOS transistors Q71 and Q81 having the same size, even when the switching element SW81 is OFF, the Nch MOS transistor Q83 stores the offset current $I_{off}$ in the resetting period of the solid-state imaging device 3 and continuously passes the offset current $I_{off}$. In other words, the Nch MOS transistor Q83 keeps storing the offset current $I_{off}$ in the previous resetting period.

In the detection period, the Nch MOS transistor Q72 and the Nch MOS transistor Q71 operate as a current mirror. The detected current "$I_{off}-I_{sig}$" in the detection period is input to the current mirror 80 including the Pch MOS transistors Q81 and Q82 without changing the detected current "$I_{off}-I_{sig}$". The current mirror 80 outputs the detected current "$I_{off}-I_{sig}$" in the detection period to the Nch MOS transistor Q83 and the output terminal $I_{OUT}$.

Since the difference between the currents of the Nch MOS transistor Q83 and the Pch MOS transistor Q82 is output to the output terminal $I_{OUT}$, as shown in FIG. 6B, "$I_{OUT}=(I_{off}-I_{sig})-I_{off}=-I_{sig}$", and only a signal component is output from the output terminal $I_{OUT}$. In other words, the Nch MOS transistor Q83 passes the offset current $I_{off}$ in the resetting period, and the current mirror 80 including the Pch MOS transistors Q81 and Q82 returns and passes the detected current "$I_{off}-I_{sig}$" in the detection period, thus accomplishing subtraction. As a result, the pure signal component $-I_{sig}$ containing no offset component $I_{off}$ is generated.

In short, when the current signal $I_{IN}$ is in the detection period, the current sampling unit 9 computes the difference between the current component "$I_{off}-I_{sig}$", which is output from the Pch MOS transistor Q82 serving as the output element of the current mirror 80, and the current component $I_{off}$ corresponding to the voltage maintained in the capacitive element C81, thus extracting the signal component $-I_{sig}$ in which the offset component is suppressed.

In the configuration shown in FIGS. 6A and 6B in which a current copier is not used as the current sampling unit 9, although the direction of the output current is opposite to that of the embodiment using the current copier, the offset current $I_{off}$, which may cause FPN, is removed, and only the original signal component $I_{sig}$ is extracted as the current signal $I_{out}$ from the output terminal $I_{OUT}$. Accordingly, the function of the current-mode CDS circuit is realized.

Unlike the embodiment shown in FIGS. 3A to 3C, when the control signal φRST for the switching element SW81 is at low level during the resetting period, a reset noise component appears at the output terminal $I_{OUT}$. Since the reset noise component is removed by a process of generating a continuous signal voltage, which is a process involving current-to-voltage conversion by the current/voltage transducer 220 in the current clamping unit 26 and conversion by the sample/hold circuit into a continuous signal, such a reset noise component will not be a problem.

The circuit according to this embodiment only includes the current mirror 70 including the Nch MOS transistors Q71 and Q72; the current mirror 80 including the switching element SW81, the capacitive element C81, and the Pch MOS transistors Q81 and Q82; and the current sampling unit 9 including the Nch MOS transistor Q83 operating as a current mirror in conjunction with the Nch MOS transistor Q71 when the switching element SW81 is ON. As in the previous embodiment, the circuit configuration is significantly simple, and the number of elements is small. The current sampling unit 9 only has two control phases, that is, the storage phase during the resetting period and the output phase during the detection period. Accordingly, the current sampling unit 9 is controlled in a very simple manner.

Figure 7A:
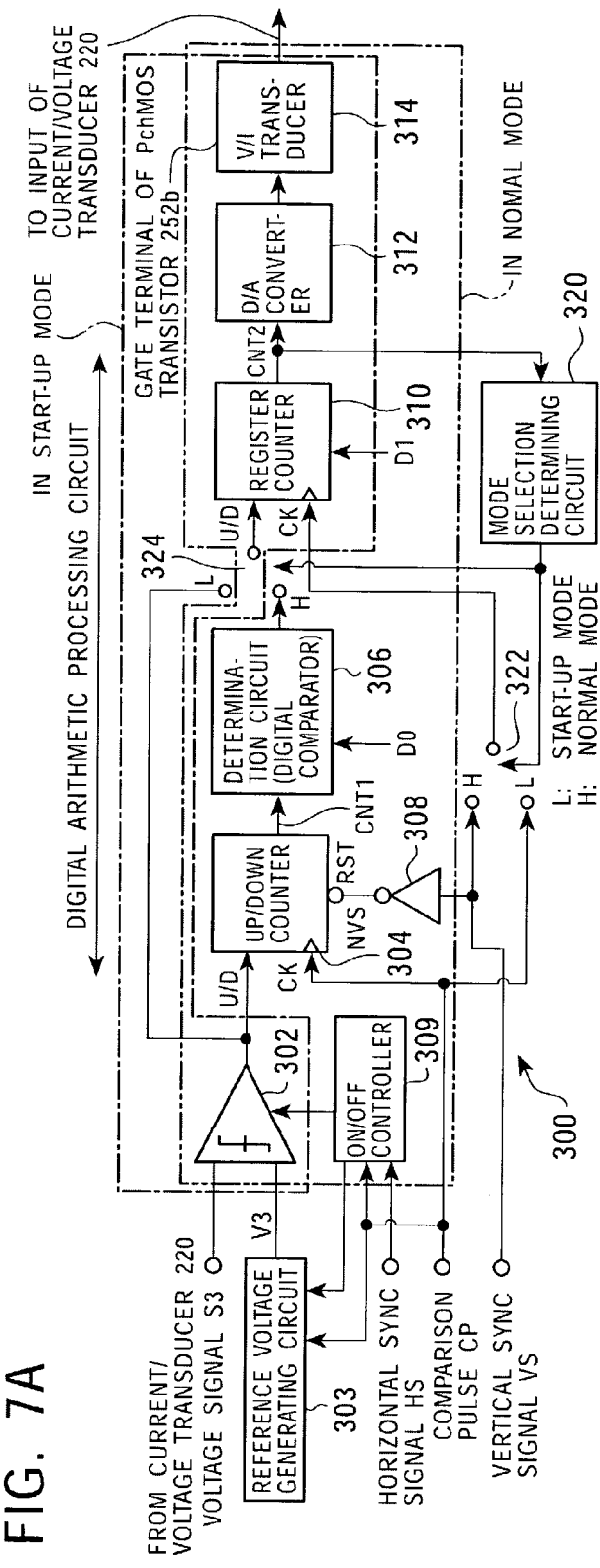
FIGS. 7A and 7B are a diagram and a chart, respectively, showing an example of the configuration of another embodiment of the clamp circuit.
Figure 7B:
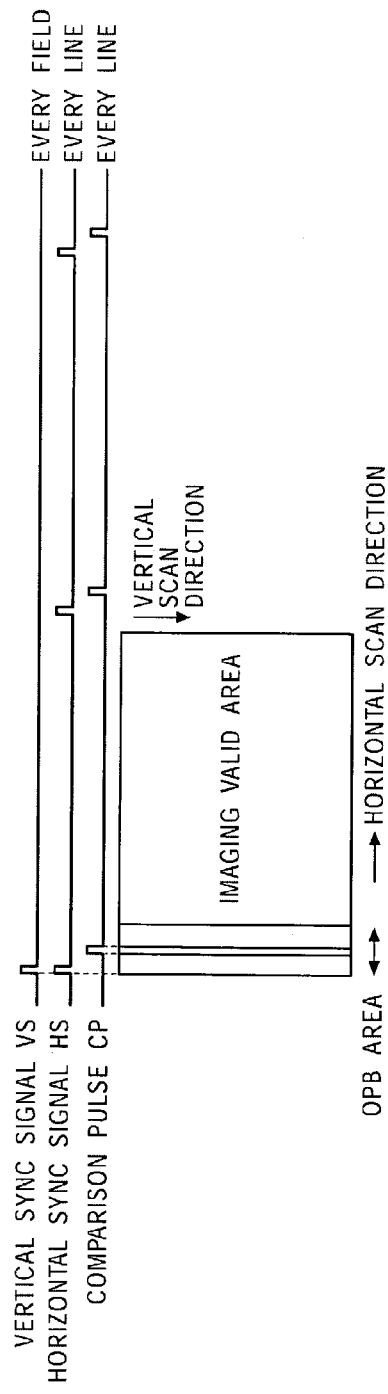

FIGS. 7A and 7B show an example of the configuration of another embodiment of the clamp circuit. FIG. 7A is a block diagram of the configuration of the clamp circuit, and FIG. 7B is a timing chart of a pulse signal used in the clamp circuit.

The configuration of a clamp circuit 300 of this embodiment includes a digital arithmetic processing circuit including a dedicated A/D converter, which is provided independent of the signal-processing-system A/D converter 28. The processing result of the digital circuit (digital value) is converted by a D/A converter into an analog voltage signal, and the analog voltage signal is supplied as the input voltage to the Pch MOS transistor 252b. Accordingly, the Pch MOS transistor 252b generates the clamp current Scp. The clamp circuit 300 operates in either a start-up mode in which the response speed is relatively high and a normal mode in which the response speed is relatively low.

As shown in FIG. 7A, the clamp circuit 300 of this embodiment includes a comparator 302 corresponding to the differential amplifier 252a of the clamp circuit 250 of the previous embodiment, an up/down counter 304 that counts the number of comparison pulses CP, and a determination circuit 306 that determines whether or not the counter value CNT of the up/down counter 304 satisfies a predetermined condition. An inverted vertical sync signal NVS generated by inverting, by an inverter 308, a vertical sync signal VS is input to a reset terminal RST of the up/down counter 304. The counter value CNT1 is reset every inverted vertical sync signal NVS.

The clamp circuit 300 further includes a register counter 310 with an up/down counting function, a D/A converter 312 that converts the counter value CNT2 of the register converter 310 directly into an analog voltage, and a voltage-to-current transducer (voltage/current or V/I transducer) 314 that converts the analog voltage output from the D/A converter 312 into a current signal. The current signal (clamp current Scp) output from the voltage/current transducer 314 is supplied to the input terminal of the current/voltage transducer 220.

A control system from the register counter 310 to the current/voltage transducer 220 has a polarity in which an increase in the counter value CNT2 causes an increase in the OPB level, and, inversely, a decrease in the counter value CNT2 causes a decrease in the OPB level. As the voltage/current transducer 314, the Pch MOS transistor 252b in the clamp circuit 250 of the previous embodiment may be used. In this case, the output of the D/A converter 312 is connected to the gate terminal of the Pch MOS transistor 252b. If necessary, an inverting amplifier is provided so that the above control polarity is realized.

The register counter 310 counts a different object in accordance with the operation mode of the clamp circuit 300. In order to achieve this mechanism, the clamp circuit 300 includes a mode selection determining circuit 320, a first switch 322 for selecting, under the control of the mode selection determining circuit 320, either the vertical sync signal VS or the comparison pulse CP to be input to a clock terminal CK of the register counter 310, and a second switch 324 for selecting either the output signal of the comparator 302 or the output signal of the determination circuit 306 to be input to an up/down selecting terminal (U/D) of the register counter 310.

Although the up/down counter 304 and the register counter 310 count different objects, the basic operations of the up/down counter 304 and the register counter 310 are the same in that both have the up/down counting function. Since the counter value CNT2 of the register counter 310 directly serves as a register value of the D/A converter 312 at a subsequent stage, an initial value D1 in accordance with a desired convergence OPB level is set to the register counter 310.

Independent of the signal-processing-system A/D converter 28 for converting the captured image signal S3 supplied from the current/voltage transducer 220 into a digital signal and processing the digital signal, the comparator 302, the up/down counter 304, and the register counter 310 are provided to serve as a DC-level-comparing A/D converter with a bit resolution lower than that of the signal-processing-system A/D converter 28.

For example, in the start-up mode, the comparator 302 and the register counter 310 effectively function as a one-bit A/D converter in which the effective sampling frequency becomes the frequency of the comparison pulse CP. In the normal mode, the comparator 302 and the up/down counter 304 effectively function as a one-bit A/D converter. The determination circuit 306 and the register counter 310 function as a digital arithmetic processor that computes, by digital signal processing, a control voltage signal in accordance with the difference between a DC level and a reference value on the basis of digital data supplied from the comparator 302 and the up/down counter 304, which function as the DC-level-comparing A/D converter, or from the register counter 310.

The operation-control vertical sync signal VS and comparison pulse CP used in the clamp circuit 300 are emitted from a timing generator (not shown). Referring to FIG. 7B, the vertical sync signal VS is a pulse transmitted at the beginning of a frame (or a field). The comparison pulse CP is a pulse transmitted at OPB pixel positions at the start side in the horizontal scan direction in conjunction with a horizontal scan signal HS transmitted at the beginning of each horizontal scan line (H) of the photo sensor 10. The comparison pulse CP is transmitted to compare each of output signals of an arbitrary column of OPB pixels at the start side in the horizontal scan direction of the solid-state imaging device 3 with a reference voltage in accordance with the timing of the comparison pulse CP. The comparison pulse CP is not transmitted at OPB pixel positions at the start side in the vertical scan direction.

A reference voltage V3 is input to one input terminal of the comparator 302. A reference voltage generating circuit 303 generates, instead of a fixed reference voltage, the reference voltage V3 swung back and forth within a predetermined range (alternately between a high voltage side and a low voltage side) every comparison pulse CP. The reference voltage V3 is a desired voltage to which the OPB level converges. The median V30 and swing width ΔV3 are determined by signal processing by a stage subsequent to the current clamping unit 26.

The comparator 302 compares the reference voltage V3 with the voltage signal S3 output from the current/voltage transducer 220 and outputs the comparison result in the form of a digital value. Specifically, the comparator 302 outputs "H (high)" when the reference voltage V3 exceeds the voltage signal S3, and otherwise outputs "L (low)". In the start-up mode, the comparison result is input to the up/down switching terminal (U/D) of the register counter 310. In the normal mode, the comparison result is input to the up/down selecting terminal (U/D) of the up/down counter 304.

The up/down counter 304 and the determination circuit 306 operate only in the normal mode. In a case in which the up/down selecting terminal (U/D) of the up/down counter 304 is at the high level, that is, the reference voltage V3 exceeds the voltage signal S3, the up/down counter 304 increments the counter value CNT1 by one when the comparison pulse CP is input to the clock terminal CK. In contrast, in a case in which the up/down selecting terminal (U/D) is at the low level, that is, the reference voltage is less than or equal to the voltage signal S3, the up/down counter 304 decrements the counter value CNT1 by one when the comparison pulse CP is input to the clock terminal CK.

Referring to FIG. 7B, the comparison pulse CP is transmitted at each OPB pixel position. As a result, a combination of the comparator 302 and the up/down counter 304 compares each output signal S3 from a predetermined column of OPB pixels in the horizontal scan direction with the reference voltage V3 in accordance with the timing of the comparison pulse CP and reflects the comparison result in the counter value CNT1 of the up/down counter 304.

The counter value CNT1 of the up/down counter 304 is input to one input terminal of the determination circuit 306. Specifically, the determination circuit 306 includes a digital comparator and receives, at the other input terminal, a determination reference (digital value) D0.

When the counter value CNT1 of the up/down counter 304 exceeds the positive determination reference value D0, the determination circuit 306 outputs a signal for decrementing the counter value CNT2 of the register counter 310 by one in response to the next vertical sync signal VS. In contrast, when the counter value CNT1 of the up/down counter 304 falls below the negative determination reference value −D0, the determination circuit 306 outputs a signal for incrementing the counter value CNT2 of the register counter 310 by one. The output of the determination circuit 306 is input to the up/down selecting terminal (U/D) of the register counter 310.

Although the component that uses the comparison result output by the comparator 302 differs between the start-up mode (the register counter 310) and the normal mode (the up/down counter 304), the counting operation based on the comparison result is performed in response to the comparison pulse CP subsequent to the horizontal scan signal HS in both the start-up mode and the normal mode. In effect, the comparison between the reference voltage V3 and the OPB level is performed in response to the comparison pulse CP subsequent to the horizontal scan signal HS.

In a period other than a period for which the comparison pulse CP is active, the comparator 302 and the reference voltage generating circuit 303 need not operate. If the comparator 302 and the reference voltage generating circuit 303 are allowed to operate, DC current passes through the comparator 302 and the reference voltage generating circuit 303, and the current is wasted. Therefore, the comparator 302 and the reference voltage generating circuit 303 need to be enabled only when the comparison pulse CP is active. In this embodiment, an ON/OFF controller 309 (specific circuit diagram thereof is omitted) generates a control signal that rises in response to the horizontal scan signal HS and falls in response to the comparison pulse CP, and the comparator 302 and the reference voltage generating circuit 303 are enabled by the control signal. Accordingly, the current consumption is reduced.

In both the start-up mode and the normal mode, when the OPB pixel output level of the voltage signal S3 output by the current/voltage transducer 220 is greater than the reference voltage V3, the clamp circuit 300 arranged as described above is connected so that the output of the comparator 302 becomes "L", thus decrementing the counter value CNT2 of the register counter 310 by one and decrementing the analog output of the D/A converter 312 by "one LSB". As a result, the entirety functions as a feedback control system so that the OPB pixel output level (OPB level) of the current/voltage transducer 220 is reduced and the difference between the OPB level and the reference voltage V3 is also reduced.

As clearly shown in FIG. 7B, the comparison pulse CP has a higher frequency than the vertical sync signal VS. When the comparison pulse CP is input to the clock input terminal CK of the register counter 310 for setting the register value of the voltage/current transducer 314, the overall control system operates at a relatively high speed. This operation state serves as the start-up mode of the clamp circuit 300. In contrast, when the vertical sync signal VS is input to the clock input terminal CK, the overall control system operates at a relatively low speed. This state serves as the normal mode of the clamp circuit 300.

When the difference between the OPB pixel output and the reference voltage V3 is less than an output change due to the fluctuation of "one LSB" of the voltage/current transducer 314, the output voltage of the voltage/current transducer 314 fluctuates every time the comparison is performed. Such a state is regarded as stable in view of the digital control. When the voltage fluctuation causes image unevenness, such a state is not regarded as a stable state, but more appropriately regarded as an oscillating state. This state indicates that the OPB pixel output is sufficiently close to the reference voltage V3.

In the actual control operation, the mode of operation to bring the OPB pixel output that is very far from the reference voltage V3 closer to the reference voltage V3 is the start-up mode (mode output is L). By causing the register counter 310 to perform counting in response to the comparison pulse CP, the control system operates at a relatively high speed. When the system operates in the start-up mode and the mode selection determining circuit 320 detects that the OPB pixel output becomes sufficiently close to the reference voltage V3, the operation mode changes to the normal mode (mode output is H) in which the operation speed is relatively low. In the normal mode, the control system operates at a lower speed and with lower sensitivity than the start-up mode in order to prevent oscillation.

The mode selection determining circuit 320 detects whether or not the OPB pixel output is close to the reference voltage V3 by monitoring a change from an increase to a decrease in the output voltage of the D/A converter 312. The determination may be performed by detecting a change from an increase to a decrease in the output voltage of the D/A converter 312 on the basis of the counter value CNT2 of the register counter 310 or by counting the number of increases and decreases.

Figure 8:
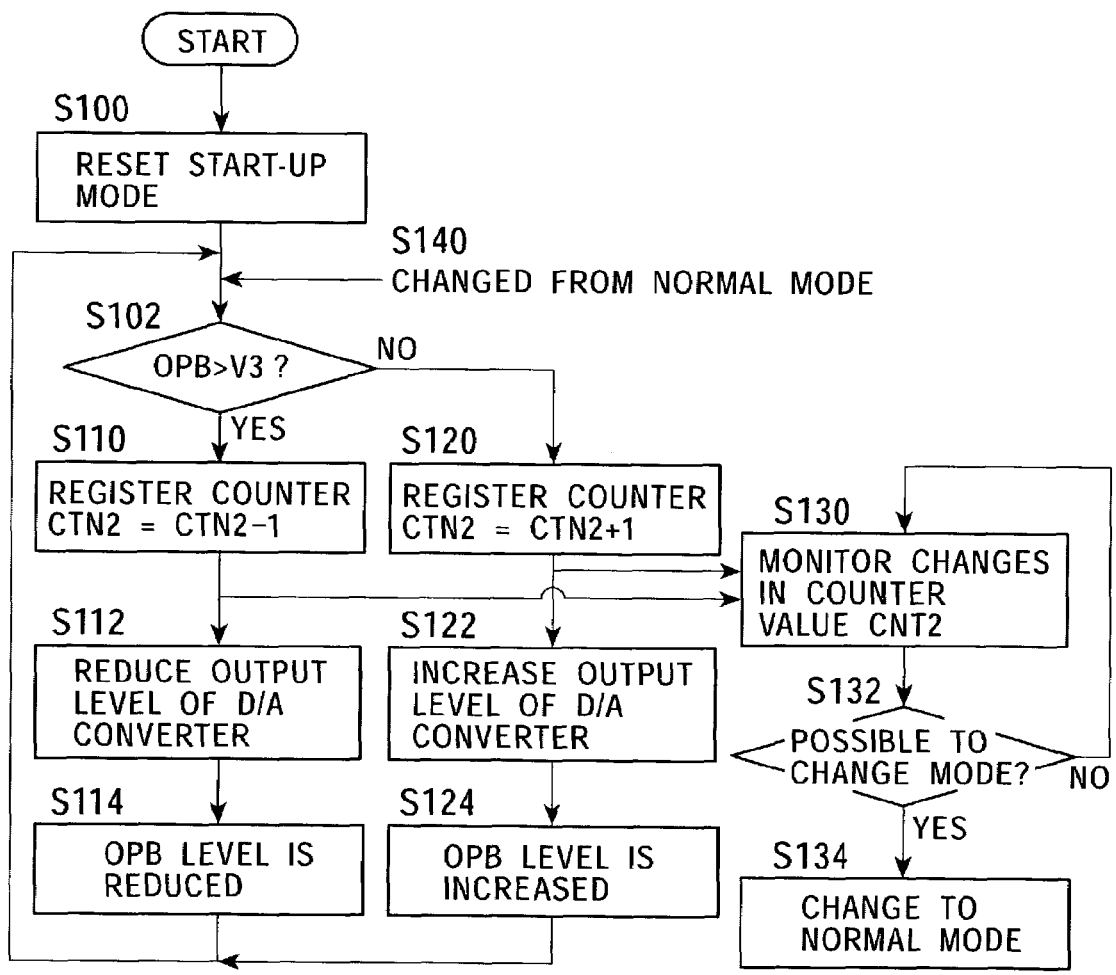
FIG. 8 is a flowchart showing a start-up-mode control process by the clamp circuit.

FIG. 8 is a flowchart showing the control operation of the clamp circuit 300 in the start-up mode. The clamp circuit 300 resets the start-up mode (S100). For example, the mode selection determining circuit 320 sets the mode output to "L". The clamp circuit 300 sets the initial value D1 to the register counter 310. In response, the D/A converter 312 outputs a voltage in accordance with the initial value D1. The voltage/current transducer 314 receives the output voltage and outputs an initial clamp current Scp to the input terminal of the current/voltage transducer 220.

The clamp circuit 300 compares the OPB level indicated by the voltage signal S3 of the current/voltage transducer 220 with the reference voltage V3 and inputs the comparison result to the register counter 310 responsible for the register value of the D/A converter 312. The result is input in response to the comparison pulse CP which rises in accordance with the OPB pixel output timing. Accordingly, the result is reflected as the result of comparison between the OPB pixel and the reference voltage V3.

Specifically, a combination of the comparator 302 and the register counter 310 compares the OPB level indicated by the voltage signal S3 of the current/voltage transducer 220 with the reference voltage V3 on the basis of the comparison pulse CP (S102). When the OPB level is greater than the reference voltage V3, the register counter 310 decrements the register counter value CNT2 by one (affirmative in S102 and S110). In response to this, the D/A converter 312 reduces the output voltage (S112). Accordingly, the OPB level is reduced (S114). Subsequently, the process returns to step S102, and the above-described processing (S102 to S114) is repeated with respect to the subsequent horizontal scan. In other words, until the OPB level becomes the reference voltage V3 or less, the above-described processing is repeated with respect to each OPB pixel of the horizontal scan to reduce the OPB level to the reference voltage V3.

In contrast, when the OPB level is less than or equal to the reference voltage V3, the register counter 310 increments the register counter value CNT2 by one (negative in step S102 and S120). In response to this, the D/A converter 312 increases the output voltage. Accordingly, the OPB level is increased (S124). Subsequently, the process returns to step S102, and the above-described processing (S102 to S124) is repeated with respect to the subsequent horizontal scan. In other words, until the OPB level becomes the reference voltage V3 or greater, the above-described processing is repeated with respect to each OPB pixel of the horizontal scan to increase the OPB level to the reference voltage V3.

During the process, the mode selection determining circuit 320 monitors the counter value CNT2 of the register counter 310 and counts the number of changes from "up" to "down" of the counter value CNT2 or the number of changes from "down" to "up" of the counter value CNT2 (S130). It is determined whether or not the number of changes satisfies a predetermined condition for changing the mode to the normal mode (S132). When the condition is satisfied, the mode selection determining circuit 320 changes the mode output from "L" to "H", thus changing the operation mode of the clamp circuit 300 to the normal mode (S134).

Since the OPB level control voltage is switched in steps S112 and S122 every comparison pulse CP, the control operation is performed at a relatively high speed. In other words, in the start-up mode, the OPB clamp level is quickly converged to a preset value.

If the clamp operation becomes unstable due to some factors and the OPB level becomes out of a predetermined range after the mode has been changed to the normal mode, the mode selection determining circuit 320 changes the mode output from "H" to "L", thus changing the operation mode of the clamp circuit 300 to the start-up mode (S140). Accordingly, the quick converging operation is restarted.

Figure 9A:
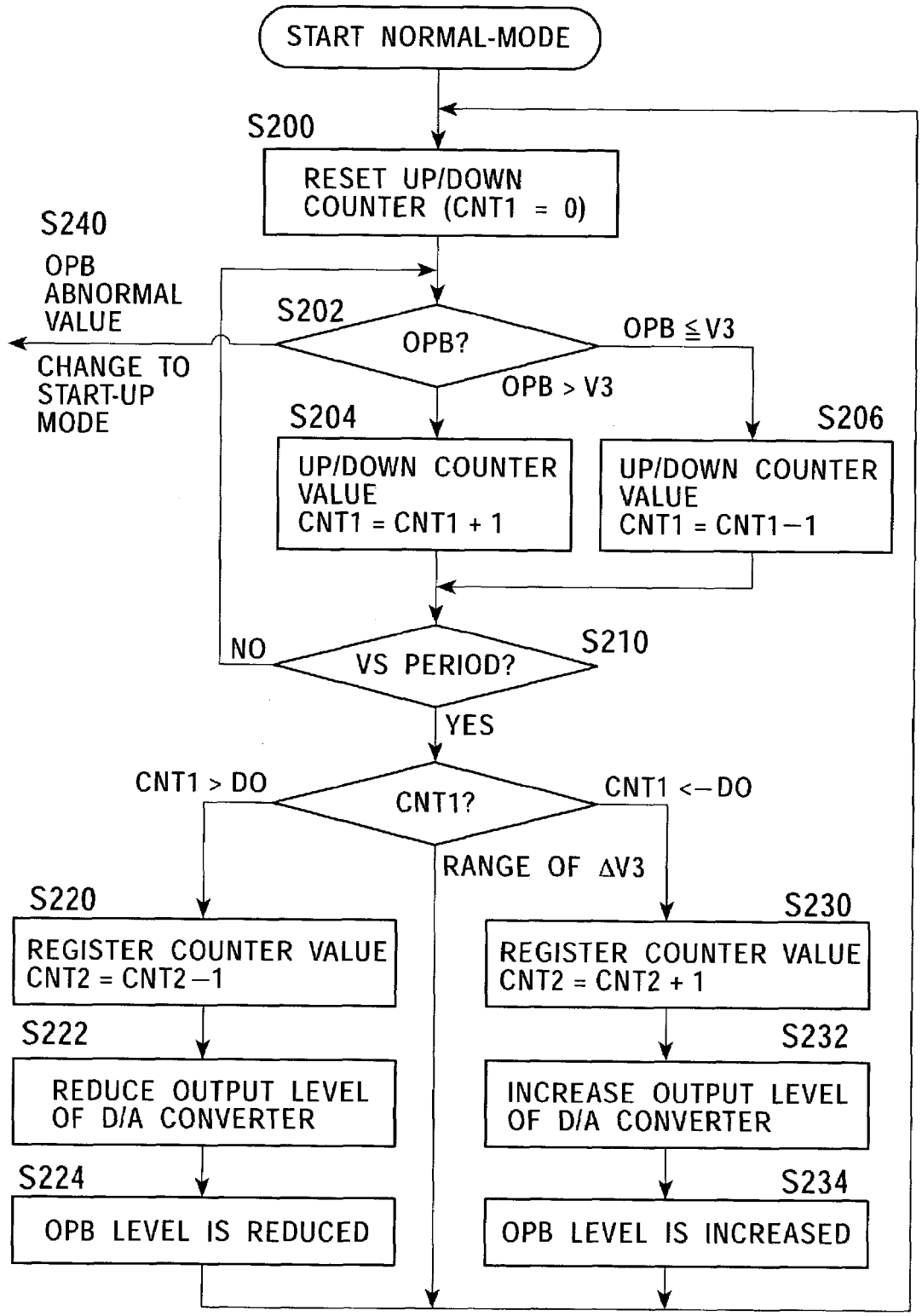
FIGS. 9A and 9B are a flowchart and a timing chart, respectively, of a normal-mode control process by the clamp circuit.
Figure 9B:
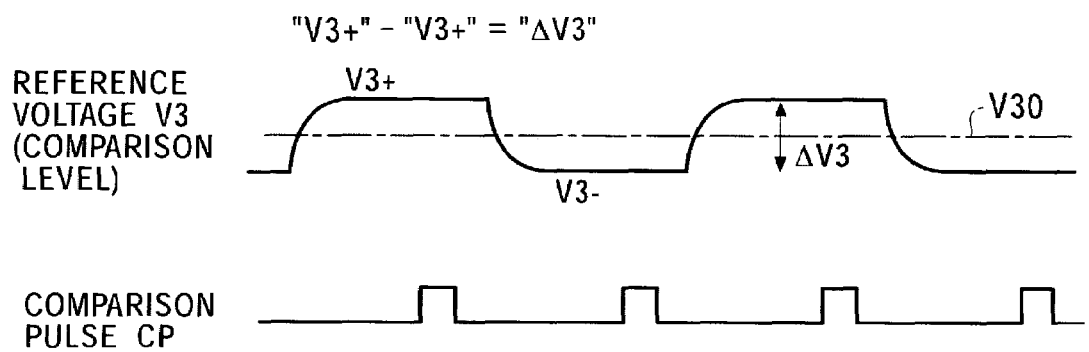

FIGS. 9A and 9B illustrate the control operation of the clamp circuit 300 in the normal mode. FIG. 9A is a flowchart of a control process, and FIG. 9B is a diagram of an example of the reference voltage V3 generated by the reference voltage generating circuit 303.

When the start-up mode is changed to the normal mode, the clamp circuit 300 resets the counter value CNT1 of the up/down counter 304 (S200). In the normal mode, the component that receives the comparison result output by the comparator 302 is changed to the register counter 310, which is cleared every vertical sync signal VS, and the comparison result is input to the register counter 310.

In a frame, when the OPB pixel output level is greater than the reference voltage V3, the counter value CNT1 is incremented by one; when the OPB pixel output level is less than or equal to the reference voltage V3, the counter value CNT1 is decremented by one. The comparison and incrementing/decrementing are repeated. When the counter value CNT1 exceeds the positive reference value D0, the determination circuit 306 sends a signal for decrementing the counter value CNT2 of the register counter 310 by one in response to the next vertical sync signal VS. In contrast, when the counter value CNT1 falls below the negative reference value −D0, the determination circuit 306 sends a signal for incrementing the counter value CNT2 by one.

Specifically, the combination of the comparator 302 and the up/down counter 304 compares the OPB level indicated by the voltage signal S3 of the current/voltage transducer 220 with the reference voltage V3 on the basis of the comparison pulse CP (S202). When the OPB level is greater than the reference voltage V3, the up/down counter 304 increments the counter value CNT1 by one (S204). In contrast, when the OPB level is less than or equal to the reference voltage V3, the up/down counter 304 decrements the counter value CNT1 by one (S206). The determination circuit 306 compares the counter value CNT1 with the determination reference D0 and inputs the comparison result to the register counter 310. The vertical sync signal VS is input to the clock terminal CK of the register counter 310. The register counter 310 checks the processing result of the determination circuit 306 every vertical sync signal VS (S210).

Referring to FIG. 9B, the reference voltage generating circuit 303 causes the reference voltage V3 in the normal mode to fluctuate up and down within the fluctuation width ΔV3 in response to every comparison pulse CP. Accordingly, for example, 64 is set as the determination reference value D0 to the determination circuit 306 so that the register counter 310 is activated when the counter value CNT1 of the up/down counter 304 exceeds ±64. When the OPB pixel output is greater than the higher level V3+ of the reference voltage V3, the up/down counter 304 increments the counter value CNT1 by one in response to every comparison pulse CP (S202 and S204). The comparison and incrementing are repeated (S210). On the 64th comparison, the counter value CNT1 reaches ±64.

When the determination by the determination circuit 306 indicates that the counter value CNT1 exceeds the positive reference value D0 (64 in this example) (S212), the register counter 310 decrements the counter value CNT2 by one in synchronization with the subsequent vertical sync signal VS (S220). In response to this, the D/A converter 312 reduces the output voltage (S222), and the OPB level is reduced (S224). Subsequently, the process returns to step S200, and the above-described processing (S200 to S224) is repeated with respect to the subsequent frame. In other words, the process is repeated until the OPB pixel output becomes close to the median value V30 of the reference voltage V3.

In contrast, when the OPB pixel output is less than or equal to the lower level V3− of the reference voltage V3, the up/down counter 304 decrements the counter value CNT1 by one (S202 and S206). The comparison and decrementing are repeated (S210). On the 64th comparison, the counter value CNT1 reaches −64. When the determination by the determination circuit 306 indicates that the counter value CNT1 falls below the negative reference value −D0 (−64 in this example), the register counter 310 increments the counter value CNT2 by one in synchronization with the subsequent vertical sync signal VS (S230). In response to this, the D/A converter 312 increases the output voltage (S232), and the OPB level is increased (S234). Subsequently, the process returns to step S200, and the above-described processing (S200 to S234) is repeated with respect to the subsequent frame. In other words, the process is repeated until the OPB pixel output becomes close to the median value V30 of the reference voltage V3.

In contrast, when the OPB pixel output is between the higher level V3+ and the lower level V3− of the reference voltage V3, the up/down counter 304 repeats incrementing and decrementing the counter value CNT1 by one every time a comparison based on the comparison pulse CP is done. As a result, the up/down counter 304 never reaches ±64, and the clamp level remains fixed. Accordingly, the fluctuation width ΔV3 of the reference voltage V3 operates as a dead zone of the clamp circuit 300. The clamp level is a discrete value corresponding to an analog value generated by converting, by the D/A converter 312, the counter value CNT2 of the register counter 310. With a fluctuation width ΔV3 of the reference voltage V3 greater than a fluctuation of the clamp level associated with one LSB of the D/A converter 312, the OPB pixel output falls in the dead zone.

In other words, the OPB clamp operation is activated with less sensitivity in the normal mode than in the start-up mode. Accordingly, a higher stability against noise is achieved. In reality, the OPB pixel output contains noise. Although the average OPB pixel output falls in the dead zone, the OPB pixel output may instantaneously exceed the fluctuation width. With great noise, in the above example, incrementing or decrementing may be done 64 times. The fluctuation is very likely to disappear in the subsequent frame, and a repetition of such operation causes surface flickering. In this case, the sensitivity of the OPB clamping is set by adjusting the fluctuation width ΔV3 of the reference voltage V3.

In the normal mode, the register counter 310 is changed in synchronization with the vertical sync signal VS. In effect, the sampling frequency becomes the frequency of the vertical sync signal VS. This means that the clamp level is changed at the beginning of one image. Accordingly, clamp noise is prevented from entering the image. Since the OPB level control voltage is changed in steps S222 and S232 every vertical sync signal VS, the control operation is performed at a relatively low speed. This ensures the stability of the OPB clamp control operation. In other words, in the normal mode, when the OPB level substantially converges to the reference value, the control operation is performed with low sensitivity to the clamp level fluctuation.

When the clamp operation becomes unstable due to some factors and the OPB level thus becomes out of the predetermined range after the mode has been changed to the normal mode (S202), the mode selection determining circuit 320 changes the mode output from "H" to "L", thus changing the operation mode of the clamp circuit 300 to the start-up mode (S240). Accordingly, the quick converging operation is restarted.

As described above, the digital arithmetic processing circuit holds a DC shift necessary to fix the OPB level output from the solid-state imaging device 3 to a predetermined value, that is, the OPB clamp level of the solid-state imaging device 3, in the form of a digital value. Accordingly, the circuit does not require an external capacitor, which is necessary when holding the OPB clamp level in the form of an analog value. Therefore, the number of components is reduced, and the mounting area is reduced. The OPB clamp function for suppressing the fluctuation in the black level of the image is realized by digital processing.

A separate provision of a circuit (A/D converter) for digitizing the clamp level, which is independent of the signal system, enables the use of a low-resolution A/D converter. For example, the OPB level is digitized by the comparator 302, which is a comparator that uses one bit to digitize the OPB level. Compared with the use of a multi-bit A/D converter, the sampling frequency is reduced. Therefore, the problem of digital noise is eased, and the circuit size is reduced. The clamp circuit 300 is integrated on the same semiconductor substrate having the solid-state imaging device 3. Accordingly, a solid-state imaging apparatus with a highly integrated clamp system is provided.

With selective use of a plurality of modes having different operation speeds and sensitivity to fluctuation in the OPB level, that is, the start-up mode having a high operation speed and normal sensitivity and the normal mode having a low operation speed and a dead zone, two contradicting characteristics of quick convergence and stability against noise are achieved. The OPB level is quickly converged even in response to a great fluctuation in the clamp level due to a sudden offset fluctuation caused by canceling the standby mode or changing the gain of the PGA. Since the sensitivity is suppressed in a stable state, the clamp level fluctuation due to noise is suppressed.

Figure 10:
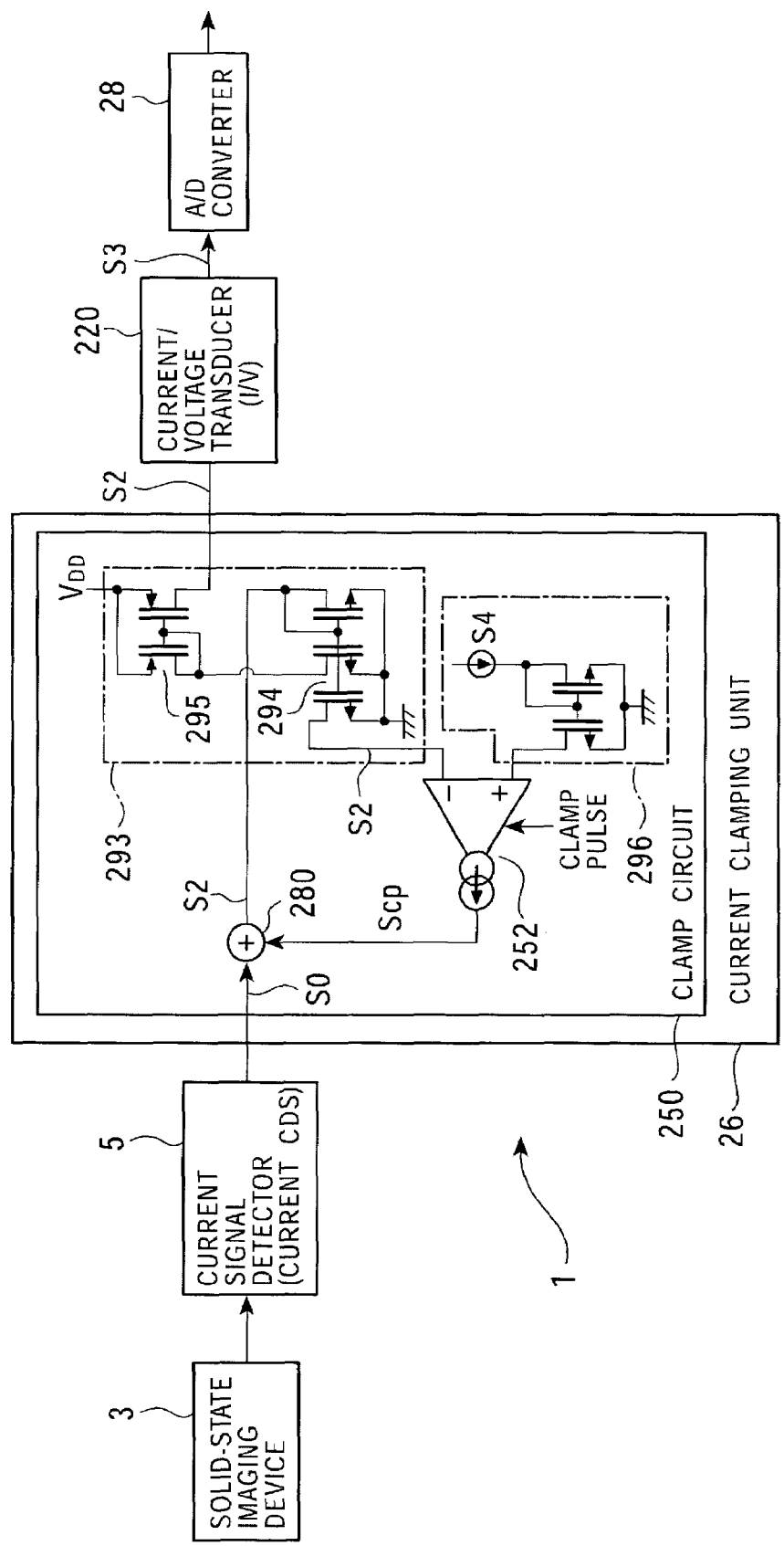
FIG. 10 is a block diagram showing another example of the configuration of the clamp circuit.

FIG. 10 is a block diagram showing another example of the configuration of the clamp circuit 250. In the previous embodiment, the signal current S0 generated by the current signal detector 5 is converted by the current/voltage transducer 220 into the voltage signal S3, and the voltage signal S3 is monitored to realize the DC clamping. In this example, a captured image signal is monitored in the current mode.

The clamp circuit 250 arranged as shown in FIG. 10 includes a current detector circuit 293 with a current mirror configuration for receiving a signal current S2 from the current signal detector 5 and a reference current source 296 with a current mirror configuration. The current detector circuit 293 includes a current mirror 294 that transfers the received signal current S2 to the differential amplifier 252 and a current mirror 295 that receives the signal current S2 projected by the current mirror 294 and transfers the received signal current S2 to the current/voltage transducer 220.

A clamp pulse for defining the clamp timing is input to a predetermined position (depending on the circuit configuration) of the differential amplifier 252. Specifically, OPB clamping is realized by inputting a pulse in accordance with the position of an OPB pixel of the solid-state imaging device 3. The differential amplifier 252 is a current-input current-output amplifier. The differential amplifier 252 compares the signal current S2 detected by the current mirror 294 of the current detector circuit 293 (or current corresponding to the detected signal current S2) with a reference current S4 and feeds back a clamp current Scp to the current adder 280 so that the difference between the signal current S2 and the reference current S4 becomes substantially zero. The DC level of the signal current S2 is maintained at a constant at the input terminal of the current/voltage transducer 220 at a stage subsequent to the current clamping unit 26.

Figure 11:
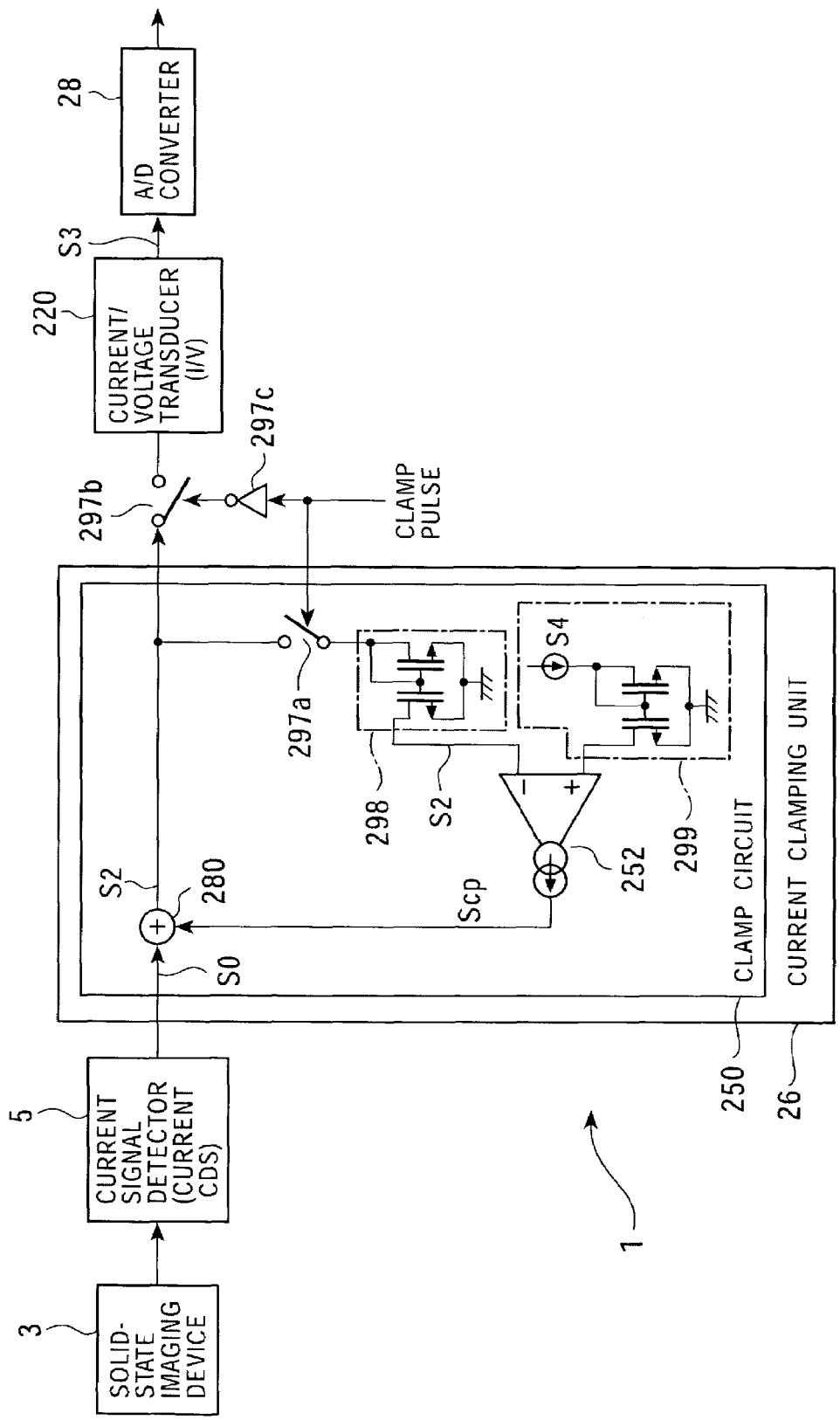
FIG. 11 is a block diagram showing another example of monitoring a current-mode captured image signal.

FIG. 11 is a block diagram showing another example of the configuration of the clamp circuit 250 for monitoring the captured image signal in the current mode. The clamp circuit 250 arranged as shown in FIG. 11 includes a current detector circuit 298 with a current mirror configuration for receiving a signal current S2 from the current signal detector 5 via a switching element 297a and a reference current source 299 with a current mirror arrangement.

The switching element 297a is controlled by a clamp pulse and defines the timing of monitoring the clamp level. In accordance with the switching element 297a, a switching element 297b is provided between the clamp circuit 250 and the current/voltage transducer 220. The switching element 297b is controlled by a pulse having opposite polarity to the clamp pulse. The switching element 297b is controlled by the clamp pulse via an inverter 297c that inverts the polarity of the clamp pulse.

The differential amplifier 252 is a current-input current-output amplifier. The differential amplifier 252 compares the signal current S2 detected by the current detector circuit 298 (or current corresponding to the detected signal current S2) with a reference current S4 defined by the reference current source 299 and feeds back a clamp current Scp to the current adder 280 so that the difference between the signal current S2 and the reference current S4 becomes substantially zero. Accordingly, the DC level of the signal current S2 is maintained at a constant at the input terminal of the current/voltage transducer 220 provided at a stage subsequent to the current clamping unit 26.

Even in the configuration such as that shown in FIGS. 10 or 11 in which the captured image signal is monitored in the current mode, the PGA 200 may be provided between the current signal detector 5 and the current adder 280. In this case, the feedback destination of the clamp current Scp may be a stage prior to the PGA 200 or subsequent to the PGA 200 (prior to the current adder 280).

As described above, according to the above-described embodiments, a clamp circuit for stabilizing the DC level of a captured image signal is a current-feedback clamp circuit in conjunction with a current-output solid-state imaging device, such as a CMOS sensor. A voltage adder and a capacitive element for cutting a DC component, which are required by a known voltage-feedback clamp circuit, become unnecessary. DC clamping for stabilizing the DC level of the output signal is realized by simply feeding back a clamp current to a signal current. Therefore, the number of components is reduced, and the number of circuits through which a signal passes is reduced. As a result, noise contamination is reduced.

The circuit for supplying a clamp current is easily implemented using, for example, constant current characteristics of MOS transistors. This contributes to simplification of the system and reduction of the number of components. In other words, when all components (e.g., the voltage operating point setting unit, the current sampling unit, and/or the clamp unit) of the current signal detector are current-operating components, in combination with the current-output solid-state imaging device, an integrated solid-state imaging device including the current signal detector and the clamp unit mounted on the same semiconductor substrate having an imaging unit (photo-sensor or pixel section) serves as an imaging apparatus. This is very convenient.

With the current-signal-processing CDS circuit and PGA circuit in conjunction with the current-feedback clamp unit, when signals are processed at a limited power supply voltage, the circuit's dynamic range is ensured more easily in a case in which current signals are processed than in a case in which voltage signals are processed.

Although the present invention has been described using the embodiments, the technical scope of the present invention is not limited to the scope of the embodiments. Various changes or modifications can be made in the embodiments without departing from the spirit and scope of the invention. Such changes or modifications are included in the technical scope of the present invention.

It is to be understood that the invention according to the following claims is not limited to the disclosed embodiments and that all combinations of features described in the embodiments need not be essential to the present invention. The above-described embodiments include the invention at various phases. Various inventions may be extracted in accordance with an appropriate combination of a plurality of disclosed features. Even when a few features are removed from all the features, the configuration from which the few features are removed may be extracted as the invention as long as the advantage of the invention is achieved.

In the above-described embodiments, a specific example of the current signal detector 5 having the current-mode CDS function includes the configuration according to the first or sixth embodiment described in Japanese Patent Application No. 2002-102108 submitted by the assignee of the present invention. However, the configuration is not limited to this and can also include the configuration according to the other embodiments described in Japanese Patent Application No. 2002-102108. Needless to say, the configuration is not limited to those described in Japanese Patent Application No. 2002-102108. Any configuration that transfers a signal obtained by the solid-state imaging device 3 in the form of a current signal to the current clamping unit 26 may be used. For example, the configuration may be combined with an FPN suppressing circuit (CDS circuit) using a two-cell current copier, which is proposed in "On-Focal-Plane Signal Processing for Current-Mode Active Pixel Sensors", IEEE Transactions on Electron Device, Vol. 44, No. 10, pp. 1747-1758, 1997.

Alternatively, the CDS circuit operating in the current mode may not be provided between the solid-state imaging device 3 and the current clamping unit 26. In this case, CDS processing is performed in the voltage mode at a stage subsequent to the current clamping unit 26. However, as is clear from the above description, this configuration is inconvenient since the size of the overall circuit increases greatly. For a combination of the solid-state imaging device 3 for outputting a captured image signal as a current signal and the current clamping unit 26 performing clamp operation in the current mode, the optimal configuration includes, between the solid-state imaging device 3 and the current clamping unit 26, the current signal detector 5 performing CDS processing in the current mode. Accordingly, the number of components is reduced, leading to space and cost reduction.

In the above-described embodiments, examples have been described in which MOS transistors are used to implement the voltage operation point setting unit, the current sampling unit, and/or the current feedback unit for feeding back a clamp current to a captured image signal. Alternatively, junction field-effect transistors or bipolar transistors may be used.

Although the above embodiments are described using examples in which the photo-sensor is an area sensor arranged in a matrix (two-dimensional), the photo-sensor is not limited to this and may be a line sensor.

Circuits described in the above embodiments may be transformed to those complementary to the circuits.

Figure 13:
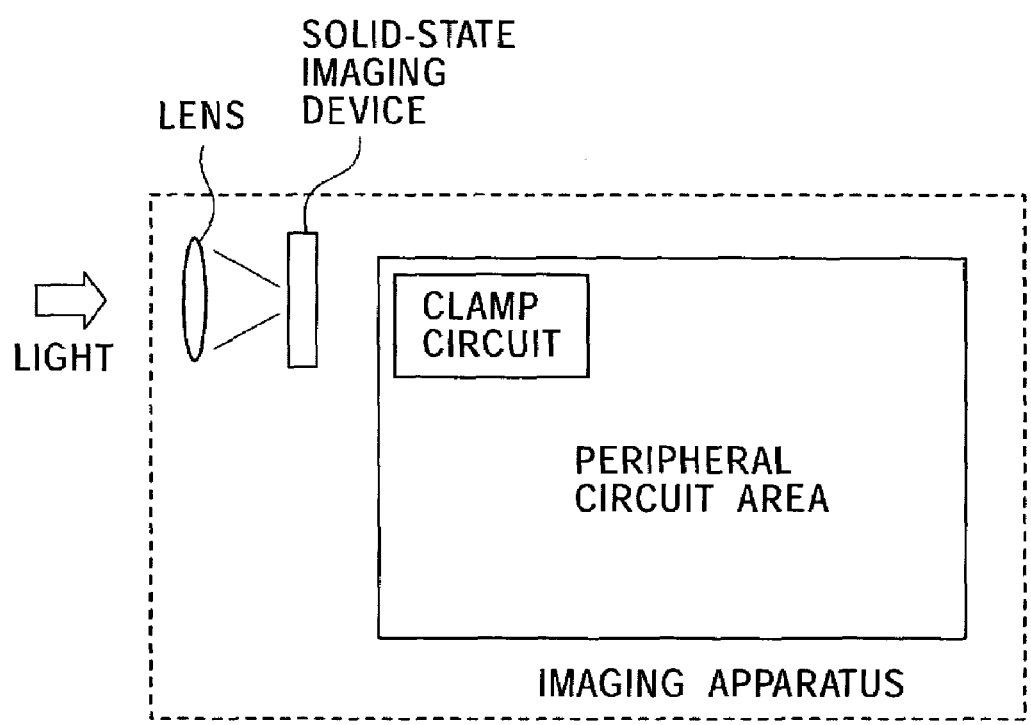
FIG. 13 is an illustration of an embodiment in which the present invention is applied to an imaging apparatus including a lens.

The present invention is applicable to an imaging apparatus including a lens, such as that shown in FIG. 13. When the imaging apparatus is incorporated as an electric equipment module into an electric apparatus, the overall electric apparatus is miniaturized due to simplification of a clamp circuit.

What is claimed is:

1. An imaging apparatus comprising:
a solid-state imaging device that outputs a current signal from each pixel via a pixel signal line;
a current feedback unit that feeds back a clamp current to a captured image signal output as a current signal from the solid-state imaging device in order to bring the DC level of the captured image signal closer to a reference value; and
a transducer which converts said current signal to a voltage signal, said voltage signal being an input signal of said current feedback unit,
wherein the current feedback unit returns the clamp current to a predetermined reference voltage source when the feedback to the captured image signal has been stopped for a resetting period.

2. The imaging apparatus according to claim 1, further comprising a DC level comparator that
detects the DC level of the captured image signal output as the current signal from the solid-state imaging device for a predetermined period of time,
compares the detected DC level with a predetermined reference value, and
computes the difference between the DC level and the reference value,
wherein the current feedback unit feeds back the clamp current to the captured image signal in accordance with the result of comparison by the DC level comparator.

3. The imaging apparatus according to claim 1, further comprising
a lens that converges rays of external light to the solid-state imaging device.

4. A captured-image-signal processing apparatus comprising
a current feedback unit that feeds back a clamp current to a captured image signal output as a current signal from a solid-state imaging device in order to bring the DC level of the captured image signal closer to a reference value;
a DC level comparator that detects the DC level of the captured image signal for a predetermined period of time, compares the detected DC level with a predetermined reference value, and computes the difference between the DC level and the reference value; and
a current-to-voltage transducer that converts the captured image signal output from the solid-state imaging device into a voltage signal,
wherein the current feedback unit feeds back the clamp current to the captured image signal in accordance with the result of comparison by the DC level comparator,
wherein the DC level comparator compares the DC level of the voltage signal for a predetermined period of time with the predetermined reference value, the voltage signal being generated by conversion by the current-to-voltage transducer; and
wherein the current feedback unit returns the clamp current to a predetermined reference voltage source when the feedback to the captured image signal has been stopped for a resetting period.

5. A captured-image-signal processing apparatus comprising
a current feedback unit that feeds back a clamp current to a captured image signal output as a current signal from a solid-state imaging device in order to bring the DC level of the captured image signal closer to a reference value; and
a DC level comparator that detects the DC level of the captured image signal for a predetermined period of time, compares the detected DC level with a predetermined reference value, and computes the difference between the DC level and the reference value,
wherein the current feedback unit feeds back the clamp current to the captured image signal in accordance with the result of comparison by the DC level comparator,
wherein the DC level comparator includes a control voltage generator that outputs a control voltage signal in accordance with the difference between the DC level and the reference value,
wherein the current feedback unit includes a voltage-to-current transducer that generates the clamp current on the basis of the control voltage signal output from the control voltage generator, and
wherein the current feedback unit returns the clamp current to a predetermined reference voltage source when the feedback to the captured image signal has been stopped for a resetting period.

6. The captured-image-signal processing apparatus according to claim 5, wherein the voltage-to-current transducer includes a metal oxide semiconductor (MOS) transistor having a gate terminal to which the control voltage signal is supplied, and the voltage-to-current transducer generates the clamp current using constant current characteristics of the MOS transistor.

7. A captured-image-signal processing apparatus comprising
   a current feedback unit that feeds back a clamp current to a captured image signal output as a current signal from a solid-state imaging device in order to bring the DC level of the captured image signal closer to a reference value;
   a DC level comparator that detects the DC level of the captured image signal for a predetermined period of time, compares the detected DC level with a predetermined reference value, and computes the difference between the DC level and the reference value; and
   a current signal detector that suppresses an offset component included in a current signal output from each pixel of the solid-state imaging device via a pixel signal line,
   wherein the current feedback unit feeds back the clamp current to the captured image signal in accordance with the result of comparison by the DC level comparator,
   wherein the current signal detector receives the current signal in the form of the current signal, the current signal being output via the pixel signal line, samples a resetting-period component of the received current signal from each pixel, computes the difference between the sampled component and a detection-period component of the current signal, and thus extracts the captured image signal in which the offset component is suppressed,
   wherein the DC level comparator detects the DC level of the captured image signal detected by the current signal detector for the predetermined period of time,
   wherein the current signal detector includes a current copier that receives and holds a resetting-period current component of the current signal in an input phase associated with the resetting period and outputs, in an output phase associated with the detection period, the current component held in the input phase, and in the detection period of the current signal, the difference between the detection-period component and the component output from a current input/output terminal of the current copier is computed,
   wherein the current feedback unit stops feeding back the clamp current to the captured image signal for the resetting period, and
   wherein the current feedback unit returns the clamp current to a predetermined reference voltage source when the feedback to the captured image signal has been stopped for the resetting period.

8. The captured-image-signal processing apparatus according to claim 7, further comprising a current-to-voltage transducer that converts the current-mode captured image signal output from the solid-state imaging device into a voltage signal,
   wherein the reference voltage source sets an operation reference point.

9. A captured-image-signal processing apparatus comprising:
   a current feedback unit that feeds back a clamp current to a captured image signal output as a current signal from a solid-state imaging device in order to bring the DC level of the captured image signal closer to a reference value; and
   a DC level comparator that detects the DC level of the captured image signal for a predetermined period of time, compares the detected DC level with a predetermined reference value, and computes the difference between the DC level and the reference value,
   wherein the current feedback unit feeds back the clamp current to the captured image signal in accordance with the result of comparison by the DC level comparator,
   wherein the DC level comparator includes, independent of a signal-processing-system analog-to-digital (A/D) converter that converts the captured image signal into a digital signal and performs digital signal processing, a DC-level-comparing A/D converter with a lower bit resolution than that of the signal-processing-system A/D converter.

10. The captured-image-signal processing apparatus according to claim 9, wherein the DC-level-comparing A/D converter comprises a one-bit A/D converter that compares the DC level of the captured image signal for the predetermined period of time with the predetermined reference value.

11. The captured-image-signal processing apparatus according to claim 9, wherein the DC level comparator includes
   a digital arithmetic processor that generates, by digital signal processing,
   a control voltage signal in accordance with the difference between the DC level and the reference value on the basis of digital data indicating the DC level for the predetermined period of time, the digital data being generated by the DC-level-comparing A/D converter, and
   wherein the current feedback unit includes a voltage-to-current transducer that generates the clamp current on the basis of the control voltage signal generated by the digital arithmetic processor.

12. A captured-image-signal processing method for bringing the direct current (DC) level of a captured image signal output as a current signal from a solid-state imaging device closer to a reference value, comprising:
   converting said current signal to a voltage signal;
   detecting the DC level of said voltage signal for a predetermined period of time;
   feeding back a clamp current to the captured image signal so that the difference between said voltage signal and a predetermined reference voltage becomes substantially zero; and
   returning the clamp current to a predetermined reference voltage source when the feedback to the captured image signal has been stopped for a resetting period.

* * * * *